US011070105B2

(12) United States Patent
Yamamoto et al.

(10) Patent No.: US 11,070,105 B2
(45) Date of Patent: Jul. 20, 2021

(54) MOTOR AND PUMP DEVICE

(71) Applicant: NIDEC SANKYO CORPORATION, Nagano (JP)

(72) Inventors: Takashi Yamamoto, Nagano (JP); Masaki Harada, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 455 days.

(21) Appl. No.: 16/043,177

(22) Filed: Jul. 24, 2018

(65) Prior Publication Data

US 2019/0036413 A1   Jan. 31, 2019

(30) Foreign Application Priority Data

Jul. 25, 2017   (JP) .............................. JP2017-143468

(51) Int. Cl.
*H02K 5/16*   (2006.01)
*F04D 13/06*   (2006.01)
(Continued)

(52) U.S. Cl.
CPC ........... *H02K 5/1672* (2013.01); *F04D 13/06* (2013.01); *F04D 29/047* (2013.01);
(Continued)

(58) Field of Classification Search
CPC .......... F16C 35/00; F16C 35/02; F16C 33/00; F16C 33/08; F16C 33/10; F16C 33/107;
(Continued)

(56) References Cited

U.S. PATENT DOCUMENTS 3,827,770 A * 8/1974 Horler ................... F16C 33/106
384/107
2002/0051589 A1 * 5/2002 Saito ....................... F16C 17/08
384/107

(Continued)

FOREIGN PATENT DOCUMENTS

CN        1114720      1/1996
CN     203743028      7/2014
(Continued)

OTHER PUBLICATIONS

"Search Report of Europe Counterpart Application", dated Dec. 17, 2018, p. 1-p. 7.
(Continued)

*Primary Examiner* — Tran N Nguyen
(74) *Attorney, Agent, or Firm* — JCIPRNET

(57) ABSTRACT

A motor includes a rotor having an output shaft and a rotor main body, a bearing member for supporting the output shaft movable in an axial line direction and rotatable around the axial line, and a bearing holding member holding the bearing member. The bearing member has a tube part supporting the output shaft and a slidably contacting part capable of slidably contacting with the rotor main body. The bearing holding member has an opposed face facing the rotor main body and a recessed part provided in the opposed face. The tube part of the bearing member is inserted into the recessed part and is separated from a bottom face of the recessed part. A space between the bottom face of the recessed part and the tube part is structured as a lubricant storage part and a communication path is provided between the bearing holding member and the bearing member.

24 Claims, 15 Drawing Sheets

(51) Int. Cl.

| | |
|---|---|
| *H02K 5/167* | (2006.01) |
| *H02K 1/14* | (2006.01) |
| *H02K 1/27* | (2006.01) |
| *H02K 3/44* | (2006.01) |
| *H02K 3/52* | (2006.01) |
| *H02K 7/08* | (2006.01) |
| *H02K 7/14* | (2006.01) |
| *F16C 17/02* | (2006.01) |
| *H02K 5/22* | (2006.01) |
| *F04D 29/057* | (2006.01) |
| *F04D 29/063* | (2006.01) |
| *F04D 29/041* | (2006.01) |
| *F04D 29/047* | (2006.01) |
| *F04D 29/051* | (2006.01) |
| *F04D 29/06* | (2006.01) |

(52) U.S. Cl.
CPC ....... *F04D 29/0413* (2013.01); *F04D 29/057* (2013.01); *F04D 29/0513* (2013.01); *F04D 29/061* (2013.01); *F04D 29/063* (2013.01); *F16C 17/02* (2013.01); *H02K 1/146* (2013.01); *H02K 1/2753* (2013.01); *H02K 3/44* (2013.01); *H02K 3/522* (2013.01); *H02K 5/167* (2013.01); *H02K 5/225* (2013.01); *H02K 7/083* (2013.01); *H02K 7/14* (2013.01); *F16C 2380/26* (2013.01)

(58) Field of Classification Search
CPC ....... F16C 33/14; F16C 33/145; F16C 43/00; F16C 43/02; F16C 17/00; F16C 17/10; F16C 17/107; F04D 29/00; F04D 29/04; F04D 29/041; F04D 29/0413; F04D 29/047; F04D 29/05; F04D 29/051; F04D 29/0513; F04D 29/057; F04D 29/06; F04D 29/061; F04D 29/063; F04D 13/00; F04D 13/06; G11B 19/00; G11B 19/20; G11B 19/203; G11B 19/2036; G11B 19/204; G11B 19/2045; H02K 5/00; H02K 5/16; H02K 5/167; H02K 5/1672; H02K 5/22; H02K 5/225; H02K 7/00; H02K 7/08; H02K 7/083; H02K 7/14
See application file for complete search history.

(56) References Cited

U.S. PATENT DOCUMENTS

| | | |
|---|---|---|
| 2013/0127276 A1 | 5/2013 | Song |
| 2015/0192171 A1 | 7/2015 | Yeh et al. |
| 2016/0230811 A1 | 8/2016 | Arai |

FOREIGN PATENT DOCUMENTS

| | | |
|---|---|---|
| CN | 104426286 | 3/2015 |
| CN | 104514969 | 4/2015 |
| CN | 105579721 | 5/2016 |
| EP | 0392739 | 10/1990 |
| EP | 1713159 | 10/2006 |
| FR | 1157493 | 5/1958 |
| JP | 2016003580 | 1/2016 |

OTHER PUBLICATIONS

"Office Action of China Counterpart Application," with English translation thereof, dated Dec. 23, 2019, p. 1- p. 12.

* cited by examiner

MOTOR AND PUMP DEVICE

CROSS REFERENCE TO RELATED APPLICATION

The present invention claims priority under 35 U.S.C. § 119 to Japanese Application No. 2017-143468 filed Jul. 25, 2017, the entire content of which is incorporated herein by reference.

TECHNICAL FIELD

The present invention relates to a motor in which a lubricant is provided between a rotation shaft of a rotor and a bearing member. Further, the present invention relates to a pump device structured to drive an impeller by the motor.

BACKGROUND

A pump device structured to rotate an impeller disposed in a pump chamber by a motor is described in Patent Literature 1 (Japanese Patent Laid-Open No. 2016-3580). In the pump device disclosed in the Literature, the motor includes a rotor which is connected with the impeller, a stator disposed on an outer peripheral side with respect to the rotor, a partition member which separates the rotor from the stator, and a resin sealing member which covers the stator on an outer peripheral side of the partition member. A magnet is held by the rotor and coils are held by the stator. The rotor is rotatably supported by a fixed shaft. The resin sealing member protects the coils from water or the like flowing through the pump chamber and supports the fixed shaft.

A structure of a pump device may be also conceivable that a rotor of a motor includes an output shaft (rotation shaft), the output shaft is protruded to an inner side of a pump chamber from an outer side, and an impeller is attached to the output shaft. In a case that such the structure is to be adopted, it is required that the output shaft is rotatably supported by a bearing member and a resin sealing member is provided with a bearing member holding part which holds the bearing member. Further, in a case that such the structure is to be adopted, it is desirable that the output shaft is smoothly rotated by applying lubricant such as grease between the bearing member and the output shaft and abnormal noise is prevented from being generated between the bearing part and the output shaft.

In this case, when a lubricant is simply applied between the bearing member and the output shaft, the lubricant is dispersed accompanied with rotation of the rotor. Therefore, due to a lapse of time, the lubricant may be depleted to obstruct smooth rotation of the output shaft or to generate abnormal noise.

SUMMARY

In view of the problem described above, the present invention is to provide a motor which is capable of supplying a lubricant between the rotation shaft of the rotor and the bearing member which supports the rotation shaft. Further, the present invention is to provide a pump device structured to drive an impeller by the motor.

The present invention provides a motor including a rotor having an output shaft and a rotor main body which holds the output shaft from an outer peripheral side, a bearing member structured to support the output shaft movable in an axial line direction and rotatable around the axial line, and a bearing holding member which holds the bearing member.

When one side of the output shaft in the axial line direction is referred to as an output side and an other side of the output shaft is referred to as an opposite-to-output side, the bearing member is provided with a tube part which supports a shaft portion on the opposite-to-output side of the output shaft with respect to the rotor main body in a penetrated state, and a slidably contacting part which is capable of slidably contacting with the rotor main body from the opposite-to-output side. The bearing holding member is provided with an opposed face which faces the rotor main body from the opposite-to-output side and a recessed part which is provided in the opposed face. The tube part of the bearing member is inserted into the recessed part, the tube part is separated from a bottom face of the recessed part, a space between the bottom face of the recessed part and the tube part on an inner side of the recessed part is structured as a lubricant storage part where a lubricant is stored, and a communication path is provided between the bearing holding member and the bearing member so as to be extended from the lubricant storage part to the output side and opened in the opposed face.

According to the present invention, the bearing member is provided with a tube part which supports the output shaft of the rotor movable in an axial line direction and rotatable around the axial line, and the tube part is inserted into the recessed part and thereby the bearing member is held by the bearing holding member. A space between the bottom face of the recessed part and the tube part of the bearing member in an inner side of the recessed part is a lubricant storage part where a lubricant is stored. Therefore, when the rotor is moved in the axial line direction, the lubricant stored in the lubricant storage part is pulled (supplied) to a gap space between the bearing member and the rotation shaft. Further, a large quantity of the lubricant can be held in the lubricant storage part in comparison with a case that a lubricant is applied between the bearing member and the output shaft. Accordingly, even in a case that the lubricant is dispersed accompanied with rotation of the rotor, the lubricant between the bearing member and the output shaft is prevented or restrained from being depleted due to a lapse of time. As a result, obstruction to smooth rotation of the output shaft and generation of abnormal noise can be prevented or restrained. Specifically, when it is structured that an end on the opposite-to-output side of the output shaft is separated from the bottom face of the recessed part at a position where the rotor main body is slidably contacted with the slidably contacting part, a large quantity of the lubricant can be held in the lubricant storage part.

Further, a communication path is provided between the bearing holding member and the bearing member so as to be extended from the lubricant storage part to the output side and opened in the opposed face of the bearing holding member. Therefore, in a case that the lubricant is stored in the lubricant storage part more than a capacity of the lubricant storage part, an excessive lubricant is discharged from the lubricant storage part to an outer side through the communication path and the opening. Further, when the rotor is moved to the opposite-to-output side in the axial line direction and is slidably contacted with the slidably contacting part of the bearing member and a protruding amount of the output shaft protruded from the tube part to the bottom face of the recessed part is increased, the capacity of the lubricant storage part is decreased. However, in this case, the lubricant more than the capacity of the lubricant storage part is escaped to the communication path. Therefore, moving of the rotor in the axial line direction is not disturbed by the lubricant. On the other hand, when the rotor is moved to the output side in the axial line direction and is separated from the slidably contacting part, a protruding amount of the output shaft protruded from the tube part to the bottom part of the recessed part is reduced and thus the capacity of the lubricant storage part is increased. However, in this case, the lubricant escaped to the communication path is returned to the lubricant storage part. Therefore, the lubricant storage part is capable of holding the lubricant over a long period.

In the present invention, in order to provide the communication path between the bearing holding member and the bearing member, it is preferable that the communication path is provided with a groove part which is formed on an outer peripheral face of the tube part. Specifically, it may be structured that the communication path is provided with a groove part which is formed on an outer peripheral face of the tube part from an end face on the opposite-to-output side of the tube part to the opposed face.

In the present invention, it may be structured that the bearing member is provided with a flange part which is enlarged from an end part on the output side of the tube part to an outer peripheral side and is abutted with the opposed face from the output side, an end face on the output side of the flange part is the slidably contacting part, a contour of the flange part when viewed in the axial line direction is provided with a straight contour portion and a circular arc contour portion which connects both ends of the straight contour portion, an opening edge of the recessed part of the bearing holding member is provided with a chamfer part in a taper shape which is inclined to the opposite-to-output side toward a side of the recessed part, and the communication path is opened between the chamfer part and the straight contour portion of the flange part. According to this structure, the position in the axial line direction of the tube part in the recessed part can be determined by abutting the flange part of the bearing member with the opposed face of the bearing holding member. Further, according to this structure, the communication path can be bent between the flange part of the bearing member and the chamfer part of the bearing holding member and thus flow passage resistance of the communication path can be increased. Accordingly, the lubricant escaped to the communication path can be restrained from being dispersed from the communication path to an outer side through the opening.

In the present invention, in order to prevent turning of the bearing member around the axial line, it is preferable that the motor includes a turning prevention mechanism structured to restrict turning of the bearing member around the axial line, the bearing member is a resin molded product, the groove part is formed with a gate trace, and the turning prevention mechanism includes a projecting part which is provided in the tube part on an opposite side to the groove part with the axial line interposed therebetween and a groove which is provided on a ring-shaped inner wall face of the recessed part and into which the projecting part is inserted. In this case, in the bearing member which is a resin molded product, a weld line is formed on the opposite side to the gate trace with the center hole of the tube part interposed therebetween and thus strength of a portion where the weld line is formed is decreased. However, when the projecting part is provided on the opposite side to the groove part (gate trace) with the center hole of the tube part interposed therebetween, the strength of the bearing member can be secured.

In the present invention, it is preferable that an end portion on the output side of the tube part is provided with a tapered face which is inclined to the opposite-to-output side toward the center hole of the tube part. According to this structure, a space between the tapered face and the output shaft functions as a lubricant reservoir and thus the lubricant can be held between the bearing member and the rotor main body.

Heat is generated between the bearing member and the rotor by slidably contacting of the bearing member with the rotor. In order to radiate the heat to the outside, it is preferable that the motor includes a stator which surrounds the rotor from an outer peripheral side and a resin sealing member which covers the stator from the opposite-to-output side and the outer peripheral side. The resin sealing member is the bearing holding member and is provided with an opposite-to-output side sealing part located on the opposite-to-output side of the rotor and the stator, the opposed face and the recessed part are provided in the opposite-to-output side sealing part, the opposite-to-output side sealing part is provided with a protruded part which is protruded to the opposite-to-output side at a position overlapping with the recessed part when viewed in the direction of the axial line, and the bottom face of the recessed part is provided on an inner side of the protruded part. In the opposite-to-output side sealing part of the resin sealing member, when the protruded part is provided at a position overlapping in the axial line direction with the recessed part which holds the bearing member, a surface area of the opposite-to-output side sealing part is increased and thus heat transmitted from the bearing member to the opposite-to-output side sealing part is easily radiated to the outside. Further, when the bottom face of the recessed part is located on an inner side of the protruded part, the lubricant storage part is formed on the inner side of the protruded part. Therefore, heat generated by slidably contacting of the bearing member with the rotor can be radiated from the bearing member to the opposite-to-output side sealing part through the lubricant stored in the lubricant storage part.

In the present invention, it is preferable that the motor includes a second bearing member structured to support the output shaft movable in the axial line direction and rotatable around the axial line, and a second bearing holding member which holds the second bearing member. The second bearing member is provided with a second tube part which supports a shaft portion on the output side of the output shaft with respect to the rotor main body in a penetrated state, and a second slidably contacting part which is capable of slidably contacting with the rotor main body from the output side. The second bearing holding member is provided with a through hole which penetrates through the second bearing holding member in the axial line direction at a position overlapping with the recessed part when viewed in the axial line direction, the second tube part of the second bearing member is inserted into the through hole, and the through hole is provided with a second lubricant storage part where a lubricant is stored in a through hole portion on the output side with respect to the second tube part. According to this structure, the output shaft of the rotor is supported by two bearing members and thus shakes of a rotation center line of the rotor can be prevented. Further, the bearing member is provided with the slidably contacting part which is capable of slidably contacting with the rotor main body from the opposite-to-output side, and the second bearing member is provided with the second slidably contacting part which is capable of slidably contacting with the rotor main body from the output side. Therefore, a moving range in the axial line direction of the rotor is restricted in a region between a first position where the rotor main body is slidably contacted with the first slidably contacting part and a second position where the rotor main body is slidably contacted with the second slidably contacting part. In addition, the through hole portion of the through hole of the second bearing holding member which holds the second bearing member is the second lubricant storage part where a lubricant is stored and thus the lubricant is supplied between the second bearing member and the output shaft. Therefore, even in a case that the lubricant is dispersed accompanied with rotation of the rotor, the lubricant between the second bearing member and the output shaft is prevented or restrained from being depleted due to a lapse of time. As a result, obstruction to smooth rotation of the output shaft and generation of abnormal noise can be prevented or restrained. In this case, it may be structured that an opening which is provided on the opposite-to-output side of the through hole of the second bearing holding member and the second lubricant storage part are communicated with each other through a gap space between a second groove part formed on an outer peripheral face of the second tube part and an inner wall face of the through hole of the second bearing holding member.

In the present invention, it may be structured that the rotor is capable of being moved in the axial line direction between a first position where the rotor main body is slidably contacted with the slidably contacting part and a second position where the rotor main body is slidably contacted with the second slidably contacting part, and an end on the opposite-to-output side of the output shaft is separated from the bottom face of the recessed part at the first position. According to this structure, generation of abnormal noise due to contacting of the bottom face of the recessed part of the bearing holding member with the output shaft can be avoided.

Further, the present invention provides a pump device including the above-mentioned motor, a pump chamber, and an impeller which is disposed in the pump chamber, and the output shaft is extended into the pump chamber from an outside of the pump chamber and the impeller is attached to the output shaft.

According to the present invention, when the rotor is moved in the axial line direction, a lubricant stored in the lubricant storage part is supplied to a gap space between the bearing member and the rotation shaft. Therefore, the lubricant is prevented or restrained from being depleted due to a lapse of time. As a result, obstruction to smooth rotation of the impeller which is attached to the output shaft of the motor and generation of abnormal noise can be prevented or restrained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of a pump device and a motor to which the present invention is applied will be described below with reference to the accompanying drawings.

(Pump Device)

Figure 1:
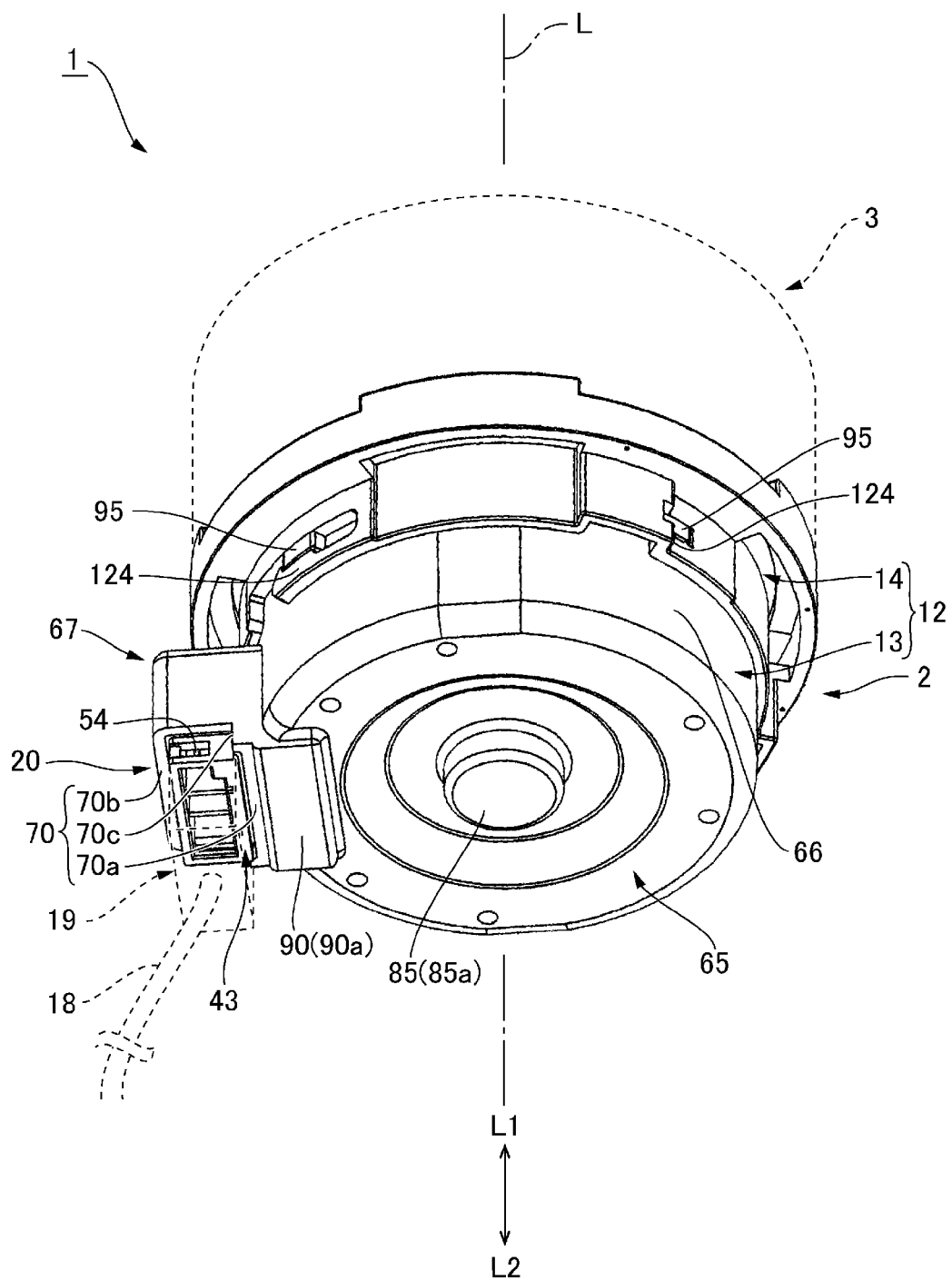
FIG. 1 is a perspective outward appearance view showing a pump device to which the present invention is applied.
Figure 2:
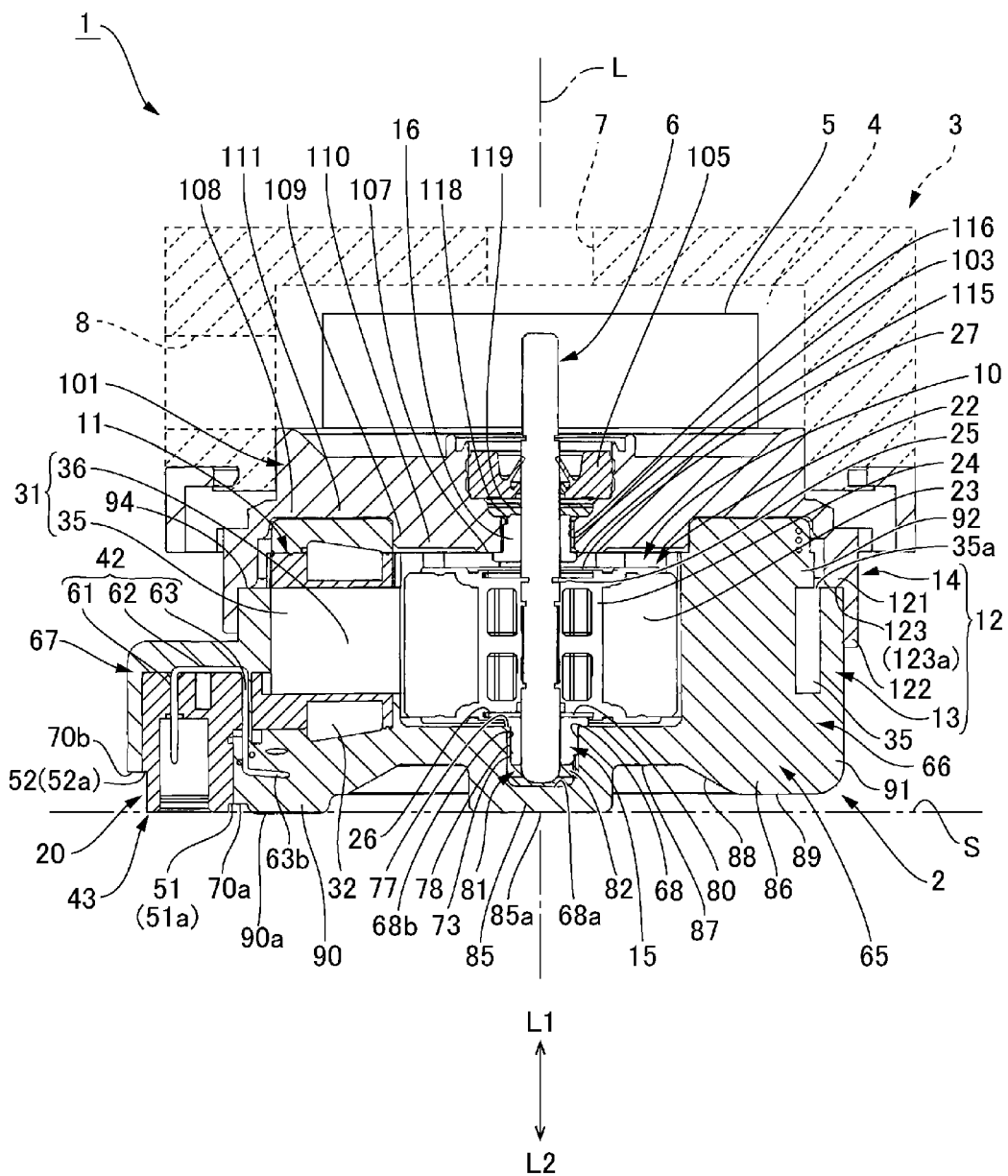
FIG. 2 is a cross-sectional view showing a pump device.
Figure 3:
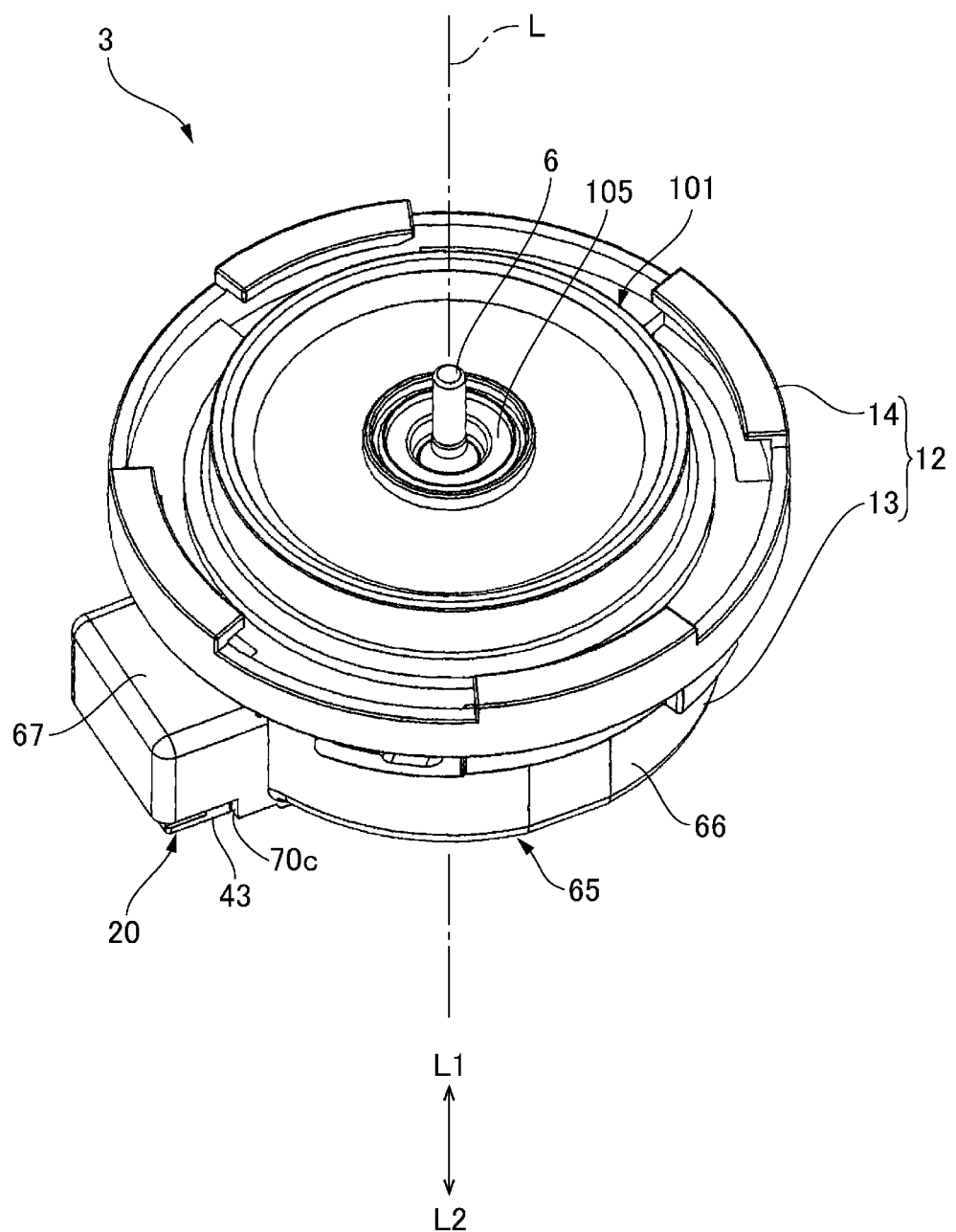
FIG. 3 is a perspective view showing a motor which is viewed from an output side.
Figure 4:
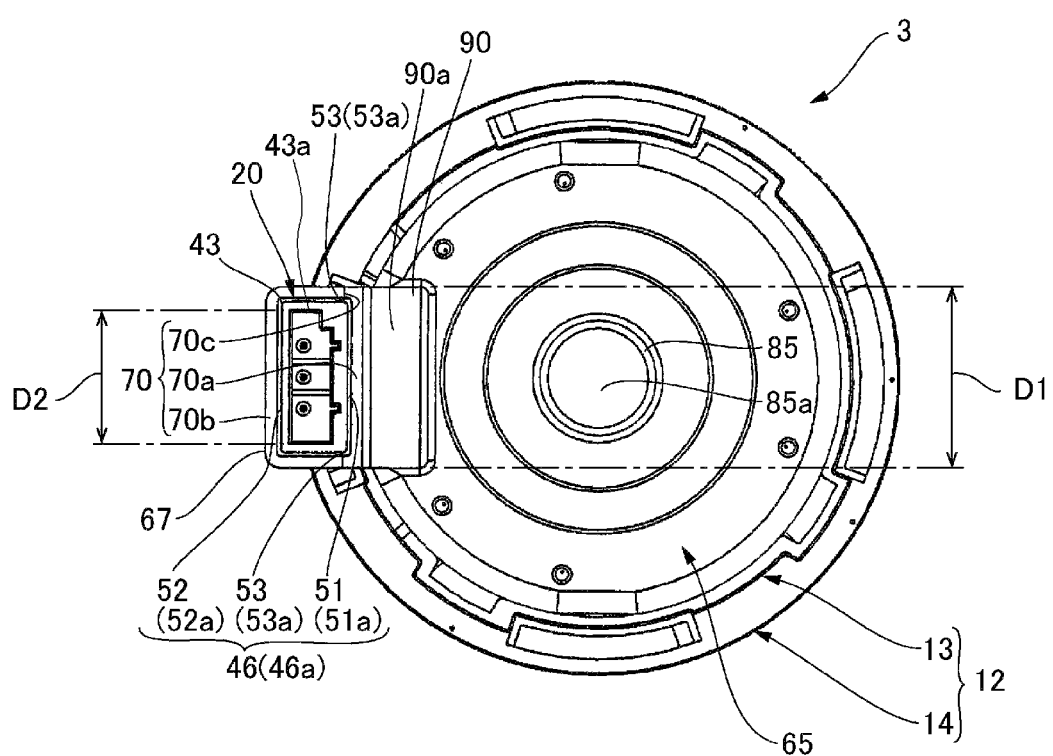
FIG. 4 is a bottom view showing a motor which is viewed from an opposite-to-output side.

FIG. 1 is a perspective outward appearance view showing a pump device to which the present invention is applied. FIG. 2 is a cross-sectional view showing a pump device. FIG. 3 is a perspective view showing a motor which is viewed from a side where an output shaft is protruded. FIG. 4 is a bottom view showing a motor. In FIGS. 1 and 2, a case body is represented by a dotted line.

As shown in FIG. 1, a pump device 1 includes a motor 2 and a case body 3 which is attached to the motor 2. As shown in FIG. 2, a pump chamber 4 is sectioned between the motor 2 and the case body 3. An impeller 5 is disposed in an inside of the pump chamber 4. The impeller 5 is attached to a shaft end portion of an output shaft 6 of the motor 2 which is extended into the pump chamber 4 from a motor 2 side (outside of the pump chamber 4). The case body 3 is provided with an inlet port 7 and an outlet port 8 for a fluid. The inlet port 7 is provided at a position overlapping with an axial line "L" of the output shaft 6 of the motor 2. The outlet port 8 is provided in a direction perpendicular to the axial line "L". When the motor 2 is driven and the impeller 5 is rotated, fluid such as water taken through the inlet port 7 is discharged from the outlet port 8 through the pump chamber 4.

In the present specification, one side in an axial line "L" direction of the output shaft 6 of the motor 2 is referred to as an upper side "L1" and the other side is referred to as a lower side "L2" corresponding to an upper and lower direction in a drawing. The upper side "L1" is a side where the impeller 5 is attached in the output shaft 6 and is an output side of the motor 2. The lower side is an opposite-to-output side of the motor 2. Further, a direction perpendicular to the axial line "L" is a radial direction, and a direction around the axial line "L" is a circumferential direction. FIG. 1 is a perspective outward appearance view showing the pump device 1 which is viewed from the lower side "L2". An axial line "L" of the output shaft 6 is a rotation center line of the rotor 10 of the motor 2, and the axial line "L" direction is a rotation center line direction.

The motor 2 is a DC brushless motor. As shown in FIG. 2, the motor 2 includes a rotor 10 having the output shaft 6, a stator 11 disposed on an outer peripheral side with respect to the rotor 10, and a housing 12 which accommodates the rotor 10 and the stator 11. As shown in FIG. 3, the housing 12 includes a resin sealing member 13 (bearing holding member) which covers the stator 11 from the lower side "L2" and a cover member 14 (second bearing holding member) which covers the resin sealing member 13 from the upper side "L1". The cover member 14 is fixed to the resin sealing member 13. As shown in FIG. 2, the resin sealing member 13 holds a first bearing member 15 which supports a shaft portion on the lower side "L2" of the output shaft 6 of the rotor 10 so as to be movable in the axial line "L" direction and rotatable around the axial line "L". The cover member 14 holds a second bearing member 16 which supports a middle portion of the output shaft 6 so as to be movable in the axial line "L" direction and rotatable around the axial line "L". The output shaft 6 of the rotor 10 penetrates through the cover member 14 from the lower side "L2" to the upper side "L1".

The cover member 14 is covered by the case body 3 from the upper side "L1". In this manner, the pump chamber 4 is sectioned between the cover member 14 and the case body 3, and the output shaft 6 is set in a state that the output shaft 6 is extended into the pump chamber 4 from the outside of the pump chamber 4. As shown in FIG. 1, a part of a connector 20 is exposed outside from a lower end portion of the resin sealing member 13. A cable side connector 19 of an external cable 18 for supplying electric power to the motor 2 is detachably connected with the connector 20 from the lower side "L2". In this case, a direction toward the upper side "L1" from the lower side "L2" is an inserting direction in which the cable side connector 19 is inserted into the connector 20, and the upper side "L1" is a front side in the inserting direction and the lower side "L2" is a rear side in the inserting direction. Therefore, the connector 20 exposes its rear side end portion in the inserting direction of the cable side connector 19 outside from a lower end portion of the resin sealing member 13.

(Rotor)

Figure 5:
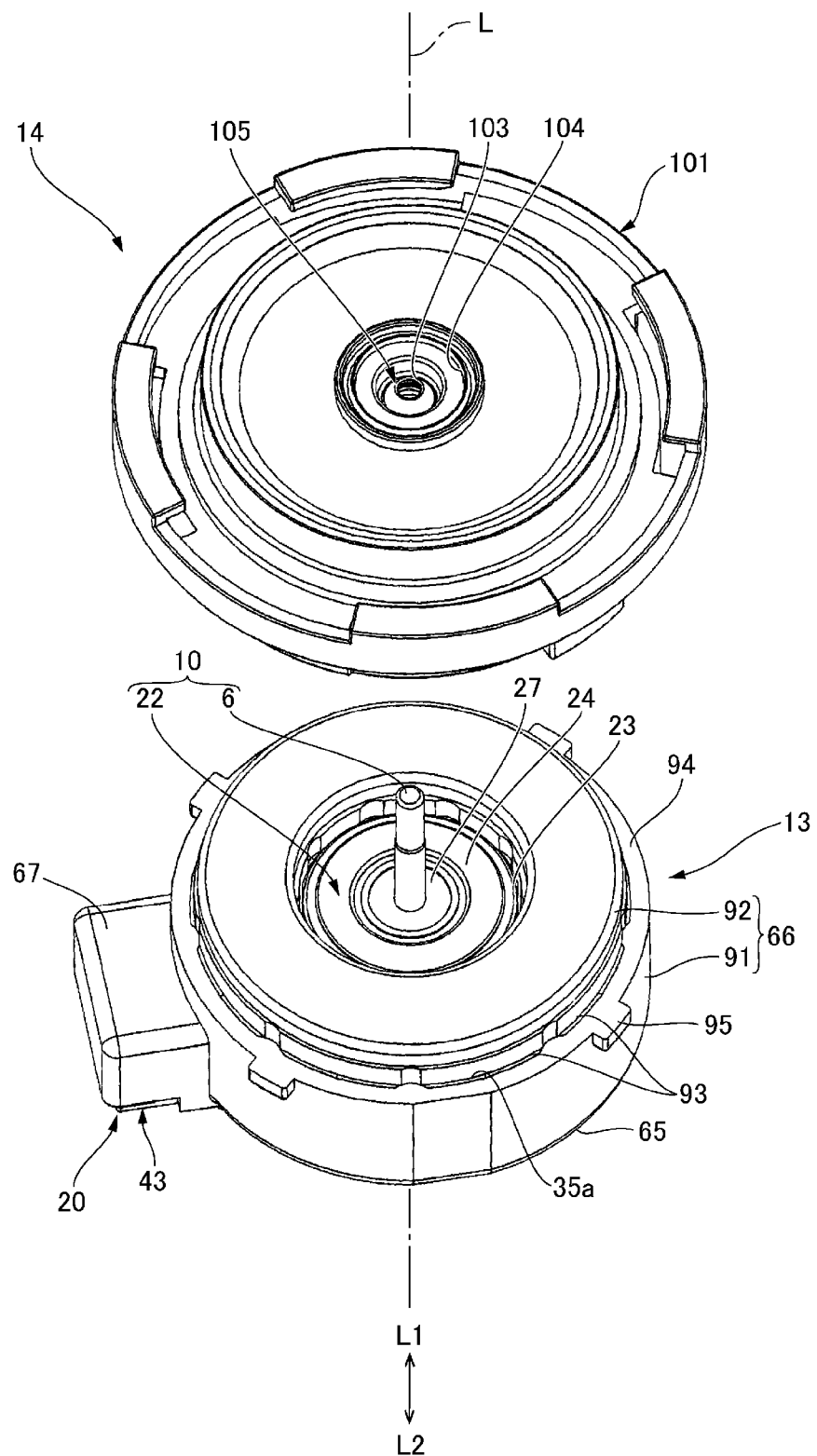
FIG. 5 is an exploded perspective view showing a motor which is viewed from an output side.
Figure 6:
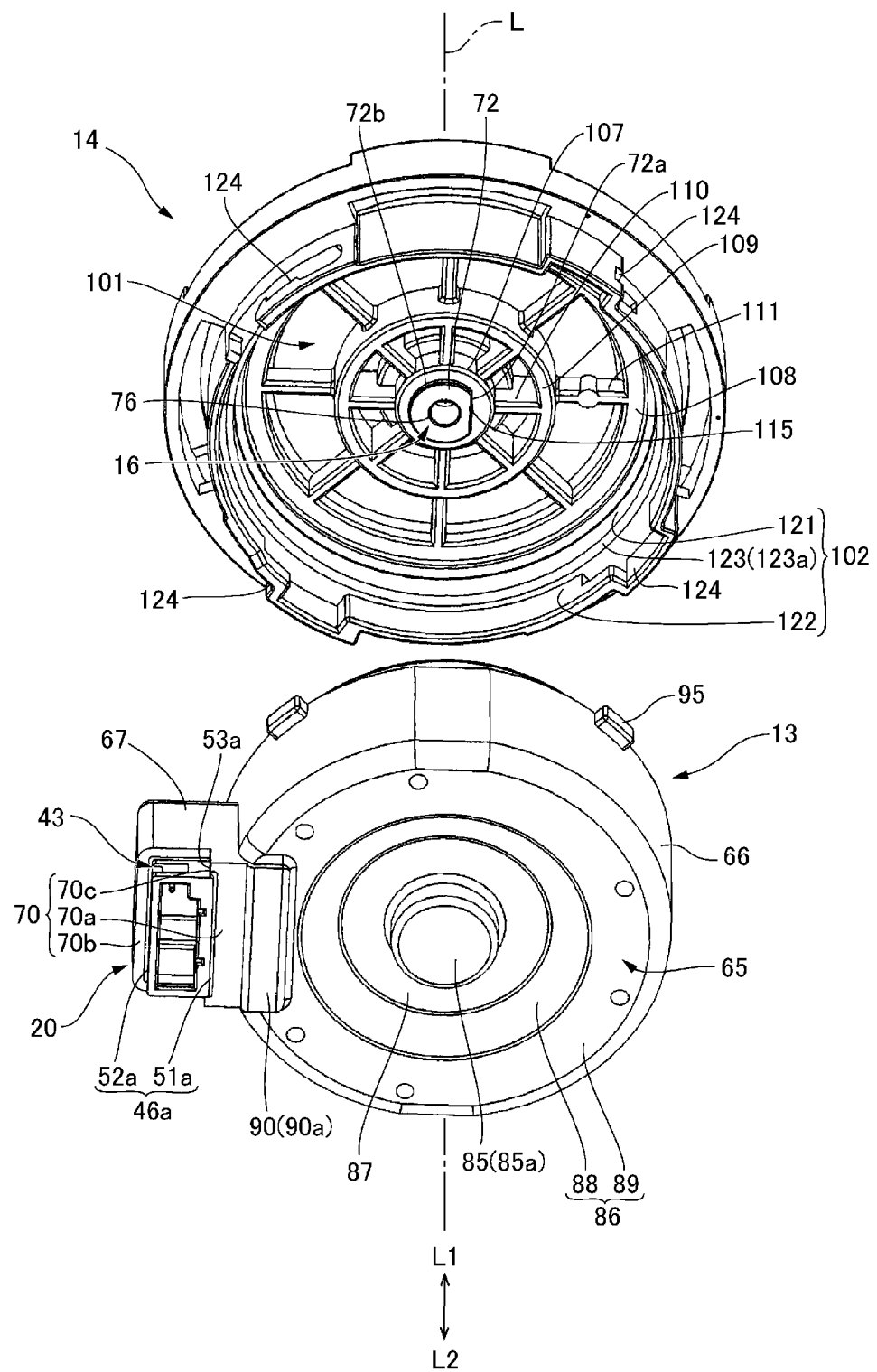
FIG. 6 is an exploded perspective view showing a motor which is viewed from an opposite-to-output side.
Figure 7:
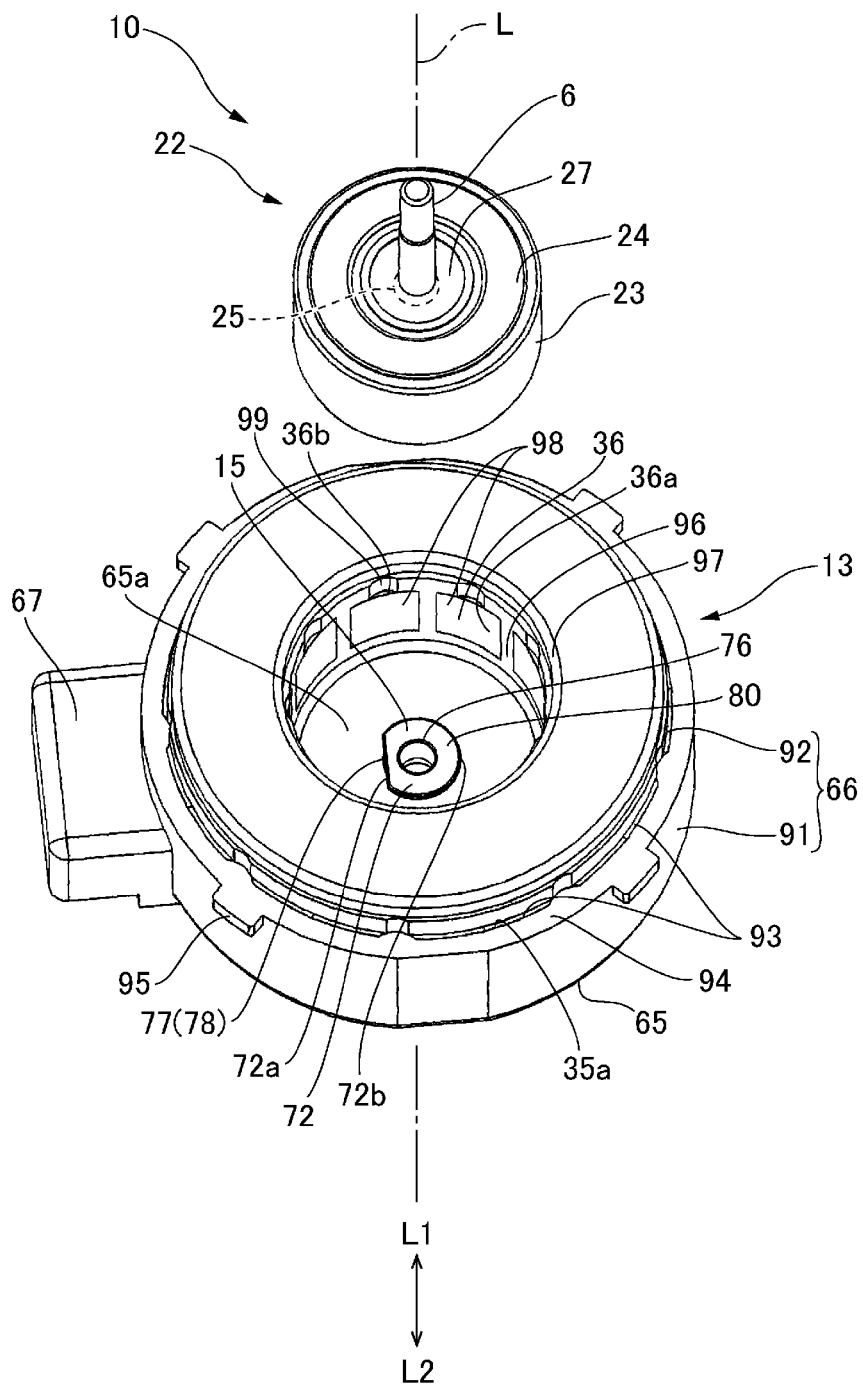
FIG. 7 is an exploded perspective view showing a motor from which a cover member is detached.
Figure 8:
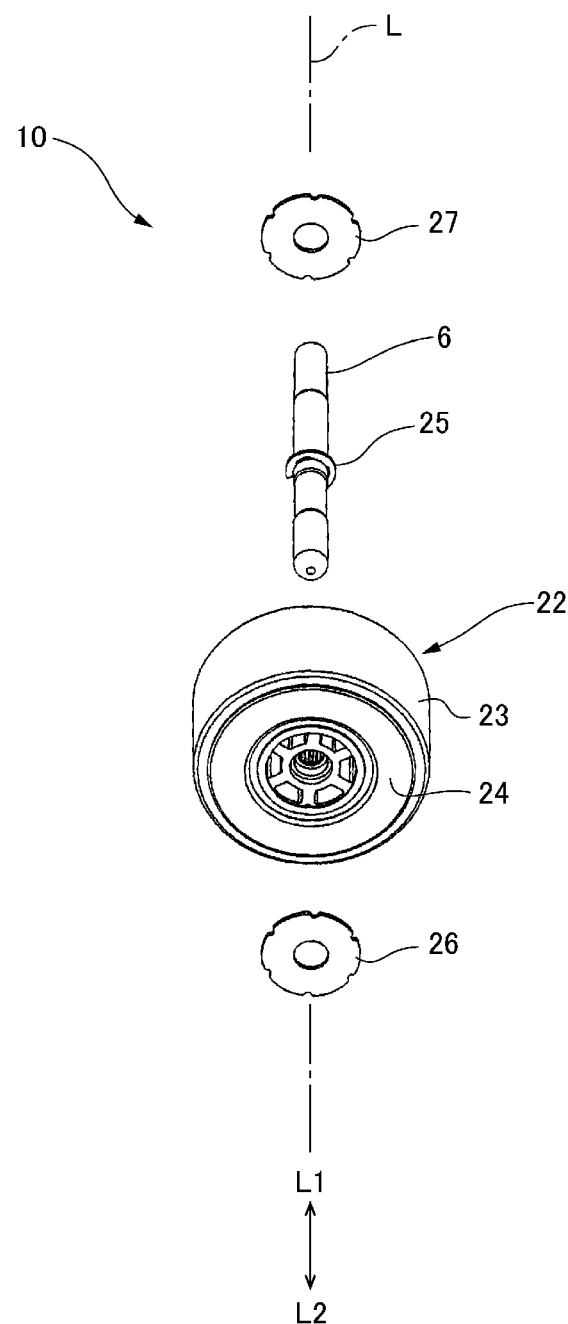
FIG. 8 is an exploded perspective view showing a rotor.

FIG. 5 is an exploded perspective view showing the motor 2 which is viewed from the upper side "L1". FIG. 6 is an exploded perspective view showing the motor 2 which is viewed from the lower side "L2". FIG. 7 is an exploded perspective view showing the motor 2 in a state that the cover member 14 is detached. FIG. 8 is an exploded perspective view showing the rotor 10.

As shown in FIG. 5, the rotor 10 includes the output shaft 6 and a rotor main body 22 which holds the output shaft 6 from the outer peripheral side. As shown in FIG. 7, the rotor main body 22 includes a ring-shaped magnet 23 surrounding the output shaft 6 and a holding member 24 which holds the output shaft 6 and the magnet 23. The magnet 23 is coaxially disposed with the output shaft 6 and an "N"-pole and an "S"-pole are alternately magnetized in a circumferential direction on its outer peripheral face. The output shaft 6 is made of stainless steel. As shown in FIG. 8, the output shaft 6 is formed with a ring-shaped groove near the center in the axial line "L" direction, and an "E"-ring 25 is fixed to the ring-shaped groove. The "E"-ring 25 is a metal plate-shaped member. The "E"-ring 25 is embedded and fixed to an upper end face of the holding member 24.

Further, the rotor main body 22 includes a first bearing plate 26 which is fixed to a lower end portion of the holding member 24 and a second bearing plate 27 which is fixed to an upper end portion of the holding member 24. Each of the first bearing plate 26 and the second bearing plate 27 is a metal plate formed in a substantially circular ring shape and, in this embodiment, the first bearing plate 26 and the second bearing plate 27 are metal washers. As shown in FIG. 2, the first bearing plate 26 covers a center portion in a radial direction of the holding member 24 from the lower side "L2" in a state that the output shaft 6 is penetrated through its center hole. The first bearing plate 26 is held by the holding member 24 in a posture perpendicular to the axial line "L". As shown in FIG. 7, the second bearing plate 27 covers the "E"-ring 25 and a center portion in the radial direction of the holding member 24 from the upper side "L1" in a state that the output shaft 6 is penetrated through its center hole. As shown in FIG. 2, the second bearing plate 27 is in surface contact with the "E"-ring 25. The second bearing plate 27 is held by the holding member 24 in a posture perpendicular to the axial line "L".

(Stator)

Figure 9A:
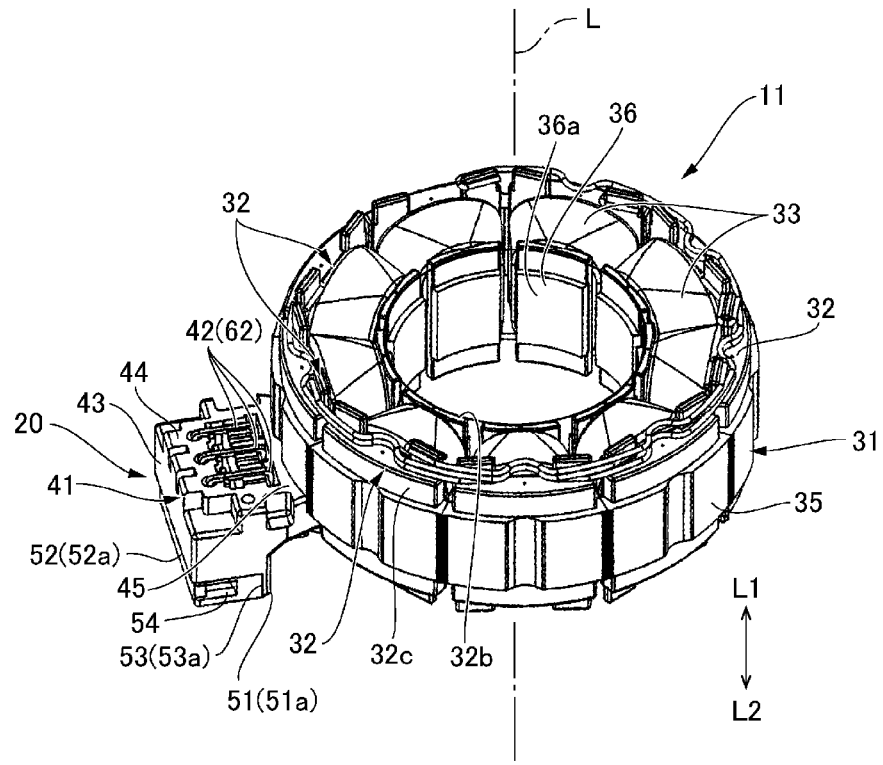
FIGS. 9A and 9B are a perspective view showing a stator and a plan view showing the stator viewed from an opposite-to-output side.
Figure 9B:
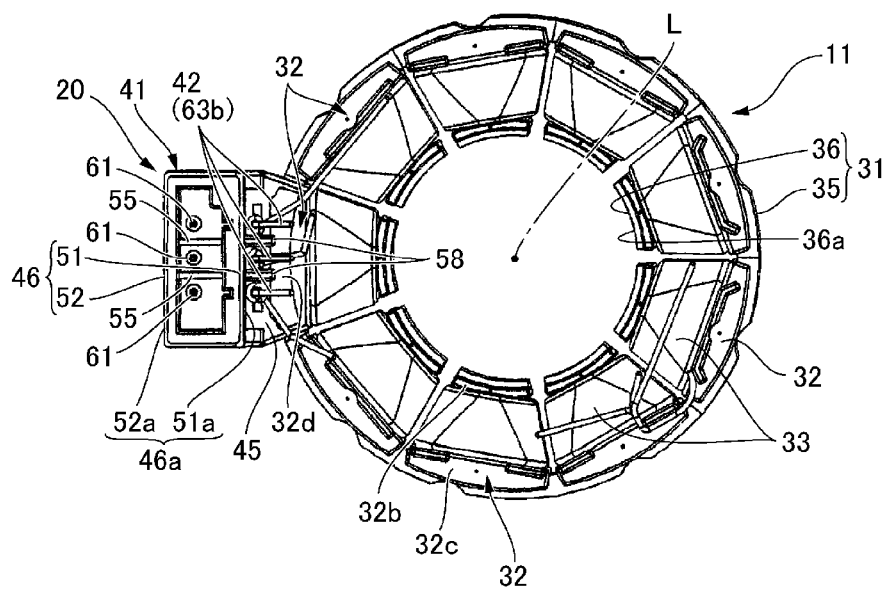
Figure 10A:
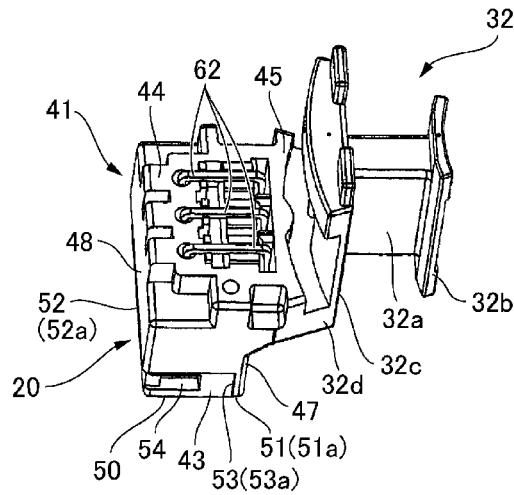
FIGS. 10A, 10B and 10C are perspective views and a cross-sectional view showing a connector and an insulator which are structured to be an integrally molded product.
Figure 10B:
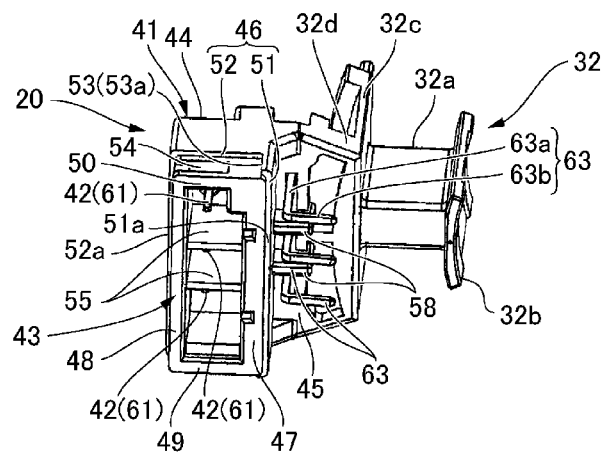
Figure 10C:
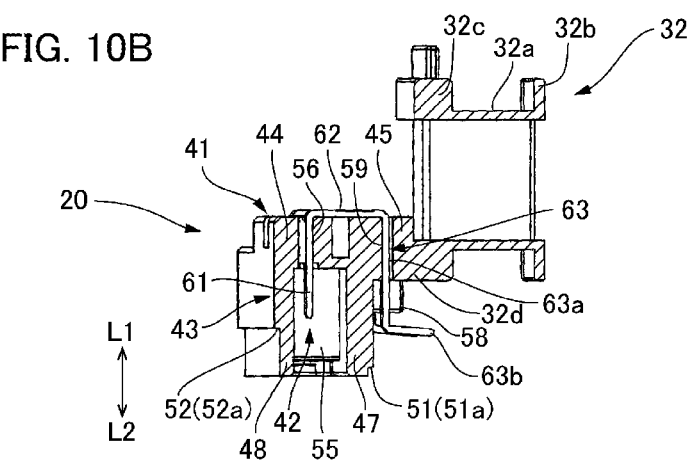

FIG. 9A is a perspective view showing the stator 11 and the connector 20 which are viewed from the upper side "L1", and FIG. 9B is a plan view showing the stator 11 and the connector 20 which are viewed from the lower side "L2". FIG. 10A is a perspective view showing the connector 20 and an insulator 32 integrated with the connector 20 which is viewed from the upper side "L1", FIG. 10B is a perspective view showing the connector 20 and the insulator 32 viewed from the lower side "L2", and FIG. 10C is a cross-sectional view showing the connector 20 and the insulator 32 integrated with the connector 20.

As shown in FIGS. 9A and 9B, the stator 11 includes a ring-shaped stator core 31 disposed on an outer peripheral side with respect to the rotor 10 and a plurality of coils 33 which are wound around the stator core 31 through insulators 32. The plurality of the coils 33 is arranged in a ring shape around the axial line "L" in a posture that their center holes are directed in radial directions. The connector 20 is disposed on an outer peripheral side with respect to the coils 33 and the stator core 31.

The stator core 31 is a laminated core which is structured of thin magnetic plates made of magnetic material which are laminated. The stator core 31 is provided with a ring-shaped part 35 and a plurality of salient pole parts 36 which are protruded to an inner side in the radial direction from the ring-shaped part 35. The plurality of the salient pole parts 36 is formed at equal angular pitches and is disposed at a constant pitch in a circumferential direction. In this embodiment, the plurality of the salient pole parts 36 is formed at an angular pitch of 40° with the axial line "L" as a center. As a result, the stator core 31 is provided with nine salient pole parts 36. An inner peripheral side end face 36a of the salient pole part 36 is a circular arc face with the axial line "L" as a center and faces an outer peripheral face of the magnet 23 of the rotor 10 through a slight gap.

Each of the insulators 32 is made of resin and has an insulation property. Each of the insulators 32 is formed in a tube shape with flanges whose both ends in the radial direction are provided with flange parts, and the insulator 32 is attached to the salient pole part 36 so that an axial direction of the insulator 32 formed in a tube shape and the radial direction of the stator 11 are coincided with each other. In other words, each insulator 32 is, as shown in FIG. 10A, provided with a tube part 32a into which the salient pole part 36 is inserted, an inner peripheral side flange part 32b which is enlarged from an end portion on an inner peripheral side of the tube part 32a, and an outer peripheral side flange part 32*c* which is enlarged from an end portion on an outer peripheral side of the tube part 32*a*. As shown in FIGS. 9A and 9B, the outer peripheral side flange part 32*c* covers an upper face and an under face of the ring-shaped part 35 of the stator core 31 to a midway position in the radial direction.

As shown in FIGS. 10A, 10B and 10C, in the plurality of the insulators 32, the insulator 32 disposed on an inner side in the radial direction of the connector 20 is integrally formed with a connector housing 41 of the connector 20. In other words, the insulator 32 closest to the connector 20 and the connector housing 41 are structured as an integrally molded product made of resin. The insulator 32 integrally molded with the connector housing 41 is, as shown in FIG. 9B and FIGS. 10A, 10B and 10C, provided with a connecting part 32*d* which is extended from the outer peripheral side flange part 32*c* to an outer peripheral side along an under end face of the ring-shaped part 35 of the stator core 31 and is continuously connected with the connector 20.

Each of the plurality of the coils 33 is wound around each of the plurality of the salient pole parts 36 through the insulator 32. Each coil 33 in a wound state around the salient pole part 36 through the insulator 32 is protruded to both of the upper side "L1" and the lower side "L2" toward an outer side in the radial direction (ring-shaped part 35 side).

The coil 33 is structured of a conducting wire (coil wire) made of aluminum alloy or copper alloy. In this embodiment, a conducting wire made of aluminum alloy covered with copper alloy is used. In this embodiment, the number of each of the salient pole parts 36, the insulators 32 and the coils 33 is 9. The motor 2 is a three-phase brushless motor, and three of nine coils 33 are "U"-phase coils, three of the six remaining coils 33 are "V"-phase coils, and three remaining coils are "W"-phase coils. The "U"-phase coil, the "V"-phase coil and the "W"-phase coil are arranged in this order in a circumferential direction. In accordance with an embodiment of the present invention, other arrangements may be adopted.

Three "U"-phase coils are formed so that one conducting wire is successively wound around three salient pole parts 36, three "V"-phase coils are formed so that one conducting wire is successively wound around three salient pole parts 36, and three "W"-phase coils are formed so that one conducting wire is successively wound around three salient pole parts 36. As shown in FIG. 9B, the three conducting wires which structure the "U"-phase coils, the "V"-phase coils and the "W"-phase coils are connected with terminal pins 42 of the connector 20.

(Connector)

The connector 20 includes the connector housing 41 which is integrally molded with the insulator 32 and three terminal pins 42 which are supported by the connector housing 41. As shown in FIGS. 9A and 9B, the connector housing 41 is disposed on an outer peripheral side with respect to the stator core 31.

As shown in FIG. 10C, the connector housing 41 is provided with a frame part 43 which is extended in the axial line "L" direction, a closing part 44 which closes an opening on the upper side "L1" of the frame part 43, and an extended part 45 which is extended toward the stator core 31 from the frame part 43 and the closing part 44. A male-type cable side connector 19 is detachably inserted into the frame part 43 from the lower side "L2". The connecting part 32*d* of the insulator 32 is continuously connected with the extended part 45 from an inner peripheral side.

As shown in FIG. 9B, an outline shape of the frame part 43 when viewed in the axial line "L" direction is a rectangular shape and its longitudinal direction is directed in a circumferential direction. The frame part 43 is provided with a step part 46 on its outer peripheral face so as to be enlarged to an outer peripheral side from a midway position in the axial line "L" direction from the lower side "L2" to the upper side "L1" (inserting direction of the cable side connector 19). A shape of the step part 46 is a ring shape when viewed from the lower side "L2" (when viewed from a rear side in the inserting direction). More specifically, as shown in FIG. 10B, the frame part 43 is provided with a first frame plate portion 47 and a second frame plate portion 48 which are extended in the circumferential direction and face each other in the radial direction, a third frame plate portion 49 which connects ends on one side in the circumferential direction of the first frame plate portion 47 and the second frame plate portion 48, and a fourth frame plate portion 50 which connects ends on the other side in the circumferential direction of the first frame plate portion 47 and the second frame plate portion 48. The step part 46 is provided with a first step part portion 51 provided on an outer peripheral face of the first frame plate portion 47 disposed on the inner peripheral side close to the axial line "L", and a second step part portion 52 which is provided on outer peripheral faces of the second frame plate portion 48, the third frame plate portion 49 and the fourth frame plate portion 50. The first step part portion 51 is provided with a first step part portion end face 51*a* facing the lower side "L2", and the second step part portion 52 is provided with a second step part portion end face 52*a* facing the lower side "L2". The first step part portion end face 51*a* and the second step part portion end face 52*a* are faces which are respectively perpendicular to the axial line "L".

In this embodiment, the first step part portion 51 is located on the lower side "L2" with respect to the second step part portion 52. Therefore, the first step part portion end face 51*a* of the first step part portion 51 is located on the lower side "L2" with respect to the second step part portion end face 52*a* of the second step part portion 52. However, as shown in FIG. 9B, when the frame part 43 is viewed in the axial line "L" direction, the first step part portion end face 51*a* and the second step part portion end face 52*a* structure a ring-shaped step part end face 46*a*. In this embodiment, as shown in FIG. 10A, an outer peripheral face of the second frame plate portion 48 is formed with a connection step part 53 which is extended in the axial line "L" direction and connects the first step part portion end face 51*a* with the second step part portion end face 52*a*. Similarly, an outer peripheral face of the fourth frame plate portion 50 is formed with a connection step part 53 which is extended in the axial line "L" direction and connects the first step part portion end face 51*a* with the second step part portion end face 52*a*. Each of the connection step parts 53 is provided with a connection step part end face 53*a* which is extended in the axial line "L" direction and faces the outer peripheral side.

Further, an engaging opening part 54 structured to engage with a cable side connector is provided on the lower side "L2" with respect to the second step part portion 52 of the second frame plate portion 48 and on an outer peripheral side with respect to the connection step part end face 53*a*. Similarly, an engaging opening part 54 structured to engage with the cable side connector is also provided on the lower side "L2" with respect to the second step part portion 52 of the fourth frame plate portion 50 and on an outer peripheral side with respect to the connection step part end face 53*a*. Each engaging opening part 54 is a rectangular through hole and, in a case that hooks are provided in the cable side connector, the hooks are engaged with the engaging opening parts 54 from outer sides in the circumferential direction of the frame part 43.

As shown in FIG. 10B, two partition walls 55 which partially section an inside space of the frame part 43 into three spaces are provided on an inner side of the frame part 43. The partition wall 55 is extended from the closing part 44 to the lower side "L2" in parallel to the third frame plate portion 49 and the fourth frame plate portion 50. As shown in FIG. 10C, each portion of the closing part 44 which is located in each of the spaces partially sectioned by the partition wall 55 is provided with a through hole 56 penetrating in the axial line "L" direction.

As shown in FIGS. 9B and 10B, the extended part 45 is provided with two ribs 58 which are protruded to the lower side "L2" and are extended from the frame part 43 to a side of the ring-shaped part 35 of the stator core 31. Each rib 58 is located on an inner peripheral side with respect to each partition wall 55 on the inner side of the frame part 43. As shown in FIG. 10C, a lower end of each rib 58 is located on the upper side "L1" with respect to the second step part portion end face 52a. In the extended part 45, a through hole 59 which penetrates in the axial line "L" direction is provided in a portion which is located between the two ribs 58, a portion located on one side with respect to one of the two ribs 58 which is located on the one side in the circumferential direction, and a portion located on the other side with respect to the other of the two ribs 58 which is located on the other side in the circumferential direction. Each through hole 59 is located on an inner peripheral side with respect to each of the through holes 56 provided in the closing part 44.

Each of the terminal pins 42 is formed by bending a metal wire whose cross-sectional shape is a quadrangular shape. As shown in FIG. 10C, the terminal pin 42 is provided with an external connection part 61, which is penetrated through the through hole 56 of the closing part 44 from the upper side "L1" to the lower side "L2" and is extended to an inner side of the frame part 43, a connecting part 62 which is extended to a side of the ring-shaped part 35 of the stator core 31 (side of the insulator 32) along an upper face of the extended part 45 from an upper end of the external connection part 61, and a coil wire connecting part 63 which is penetrated through the through hole 59 of the extended part 45 from an end of the connecting part 62 on the side of the ring-shaped part 35 and is extended from the upper side "L1" to the lower side "L2". Each terminal pin 42 is press-fitted to the through hole 56 of the closing part 44 and the through hole 59 of the extended part 45. In this manner, the three terminal pins 42 are arranged at equal intervals in the circumferential direction.

The external connection parts 61 of the terminal pins 42 are respectively disposed in three spaces which are sectioned on an inner side of the frame part 43 by the partition walls 55. The external connection parts 61 of the respective terminal pins 42 are prevented from contacting with each other by the partition wall 55. When a cable side connector 19 is connected with the connector 20, the external connection parts 61 are electrically connected with the cable 18. Further, the rib 58 is provided between two of the three coil wire connecting parts 63 adjacent to each other in the circumferential direction. As a result, the coil wire connecting parts 63 are respectively prevented from contacting with each other.

In this embodiment, the connecting part 62 is extended between the external connection part 61 and the coil wire connecting part 63 in a direction perpendicular to the axial line "L". Further, as shown in FIG. 2, when viewed in a direction perpendicular to the axial line "L", the connecting part 62 is located at a position overlapping with the stator core 31. Therefore, when the terminal pin 42 is to be supported by the connector housing 41 (when the terminal pin 42 is to be press-fitted into the through hole 56 and the through hole 59), even in a case that a force is applied to the connector housing 41 in a direction inclined to the axial line "L" and deformation may be occurred between the insulator 32 and the connector housing 41 which are an integrally molded product, the deformation is restrained because the connecting part 62 of the terminal pin 42 located on an outer peripheral side of the stator core 31 functions as a support.

As shown in FIG. 10C, the coil wire connecting part 63 is provided with a straight part 63a, which is extended in a straight line shape to the lower side "L2" from the connecting part 62 and reaches to the lower side "L2" with respect to the stator 11, and a bending part 63b which is bent from the straight part 63a to the stator 11 side. As shown in FIG. 9B, when viewed in the axial line "L" direction, a tip end of the bending part 63b is overlapped with the ring-shaped part 35 of the stator core 31. The coil wire connecting parts 63 of three terminal pins 42 are respectively connected with a conducting wire structuring the "U"-phase coil, a conducting wire structuring the "V"-phase coil, and a conducting wire structuring the "W"-phase coil. The bending part 63b is a coming-off prevention part which prevents the coil 33 from coming off from the terminal pin 42. In this case, two ribs 58 located between two adjacent coil wire connecting parts 63 are, as shown in FIG. 10C, located on the upper side "L1" with respect to the bending part 63b.

(Resin Sealing Member)

Figure 11:
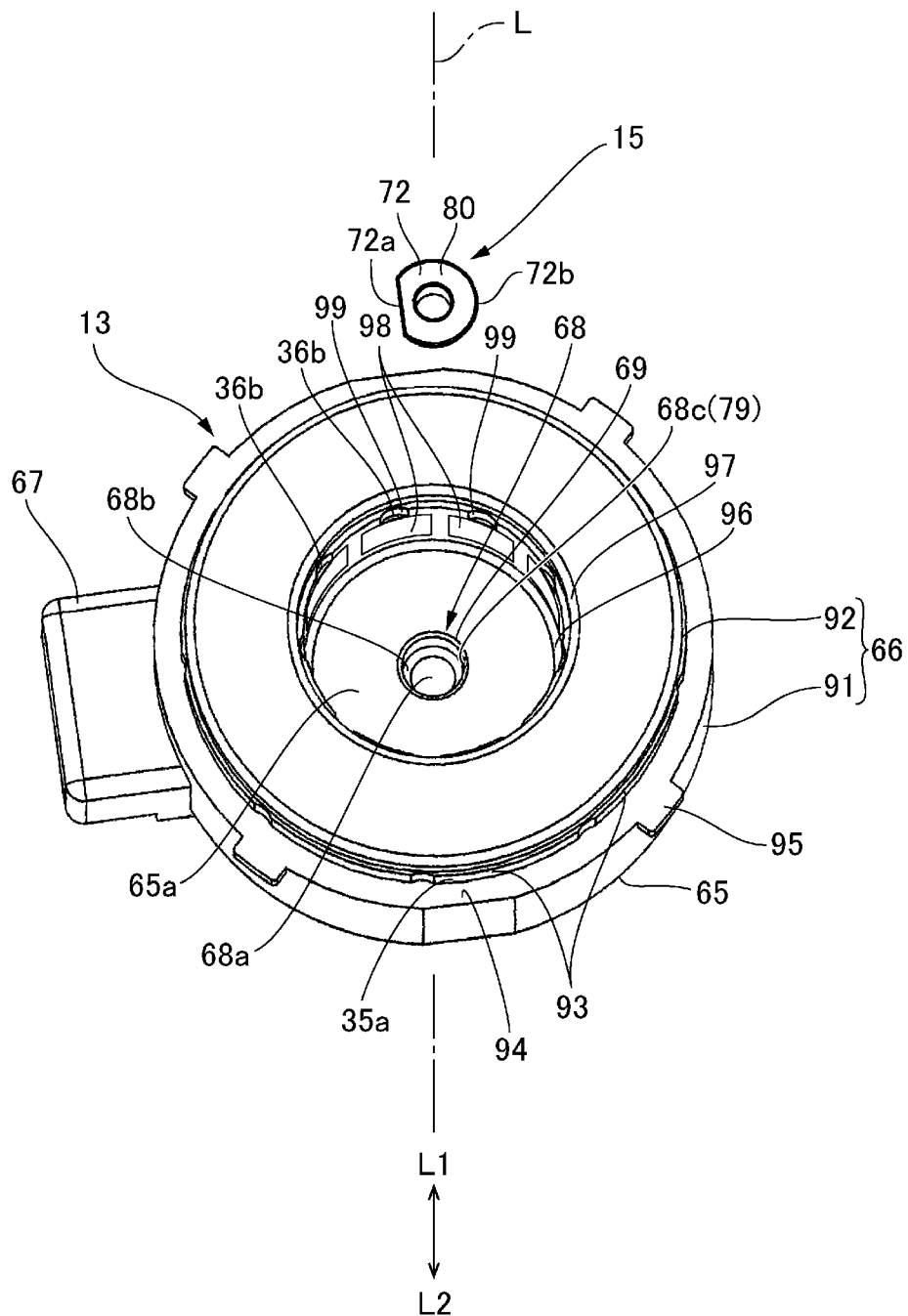
FIG. 11 is an exploded perspective view showing a resin sealing member and a first bearing member.

FIG. 11 is an exploded perspective view showing the resin sealing member 13 and the first bearing member 15. As shown in FIGS. 6 and 7, the resin sealing member 13 is provided with a sealing member bottom part 65 in a disk shape (opposite-to-output side sealing part), which covers the coils 33, the insulators 32 and the stator core 31 from the lower side "L2", a sealing member tube part 66 which is extended to the upper side "L1" from the sealing member bottom part 65, and a connector sealing part 67 which is protruded to an outer peripheral side from the sealing member tube part 66. The resin sealing member 13 covers the coils 33 and the insulators 32. Further, the resin sealing member 13 covers the stator core 31 except an outer peripheral edge portion of an upper face of the ring-shaped part 35 and end portions on an inner peripheral side of the salient pole parts 36.

As shown in FIG. 11, the sealing member bottom part 65 is provided with a bearing member holding recessed part 68 (bearing member holding part), which holds the first bearing member 15, on an opposed face 65a facing the rotor main body 22 on an inner side with respect to the stator core 31. The bearing member holding recessed part 68 is provided with a circular bottom face 68a and a ring-shaped inner wall face 68b which is stood up from an outer peripheral edge of the bottom face 68a and extended to the upper side "L1". A groove 68c extended in the axial line "L" direction is formed in a part in the circumferential direction of the ring-shaped inner wall face 68b. Further, the sealing member bottom part 65 is provided with a chamfer part 69 in a taper shape in the opposed face 65a so as to be inclined to the lower side "L2" toward a side of the bearing member holding recessed part 68 (toward the axial line "L") in an opening edge of the bearing member holding recessed part 68.

Figure 12A:
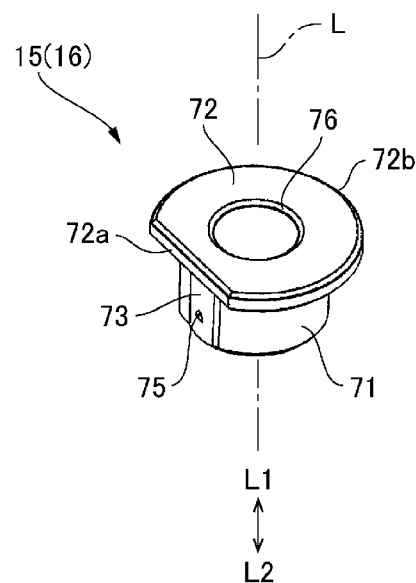
FIGS. 12A and 12B are perspective views showing a first bearing member.
Figure 12B:
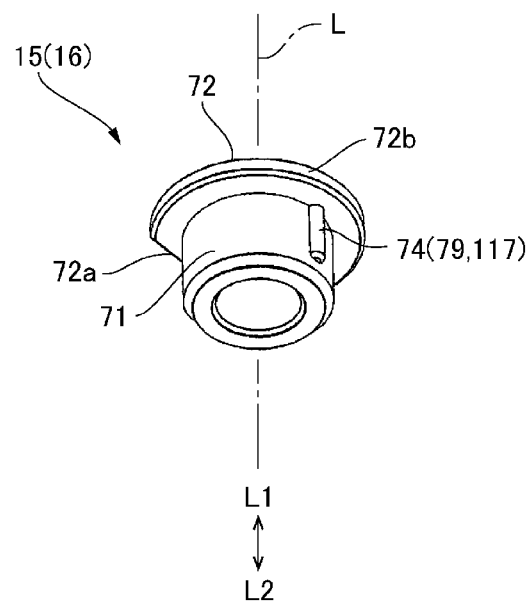

FIG. 12A is a perspective view showing the first bearing member 15 which is viewed from the upper side "L1" and FIG. 12B is a perspective view showing the first bearing member 15 which is viewed from the lower side "L2". The first bearing member 15 is made of resin. As shown in FIGS. 12A and 12B, the first bearing member 15 is provided with a tube part 71 having a center hole through which the output shaft 6 is penetrated, and a flange part 72 which is enlarged to an outer peripheral side from the upper end of the tube part 71. A portion in the circumferential direction of an outer peripheral face of the tube part 71 is, as shown in FIG. 12A, formed with a groove part 73 which is extended in the axial line "L" direction with a constant width from an under end face of the tube part 71 to the flange part 72, in other words, from an end face on the opposite-to-output side of the tube part 71 to the opposed face 65a. Therefore, a continuous gap space is formed in the axial direction between the groove part 73 of the tube part 71 and the ring-shaped inner wall face 68b of the bearing member holding recessed part 68. Further, as shown in FIG. 12B, a projecting part 74 extended in the axial line "L" direction with a constant width is formed on an outer peripheral face of the tube part 71 on an opposite side to the groove part 73 with the axial line "L" interposed therebetween. The groove part 73 is formed with a gate trace 75 which was connected with a gate for resin injection when the first bearing member 15 was injection-molded. A contour of the flange part 72 is, when viewed in the axial line "L" direction, a "D"-shape having a straight contour portion 72a extended in a straight shape and a circular arc contour portion 72b in a circular arc shape connecting both ends of the straight contour portion 72a with each other. The straight contour portion 72a is provided at the same angular position as the groove part 73 around the axial line "L". In other words, the straight contour portion 72a is located on an opposite side to the projecting part 74 with the axial line "L" interposed therebetween. An upper end face of the tube part 71 located on an inner peripheral side of the flange part 72 is formed with a tapered face 76 which is inclined to the lower side "L2" toward the center hole of the tube part 71.

The tube part 71 of the first bearing member 15 is inserted into the bearing member holding recessed part 68 in a posture that positions of the projecting part 74 and the groove 68c of the bearing member holding recessed part 68 are coincided with each other around the axial line "L". Next, as shown in FIG. 7, the flange part 72 is abutted with the opposed face 65a of the sealing member bottom part 65 from the upper side "L1" and the first bearing member 15 is fixed to the bearing member holding recessed part 68. In a state that the first bearing member 15 is fixed to the bearing member holding recessed part 68, an upper end face 80 of the flange part 72 is perpendicular to the axial line "L". The tube part 71 and the bottom face 68a of the bearing member holding recessed part 68 are separated from each other in the axial line "L" direction. Further, the projecting part 74 of the first bearing member 15 and the groove 68c of the bearing member holding recessed part 68 structure a turning prevention mechanism 79 which prevents turning of the first bearing member 15 around the axial line "L".

Further, in a state that the first bearing member 15 is fixed to the bearing member holding recessed part 68, an opening 77 is formed between the chamfer part 69 in a taper shape in the opposed face 65a provided at an opening edge of the bearing member holding recessed part 68 and the straight contour portion 72a of the flange part 72.

When the rotor 10 is supported by the first bearing member 15, a shaft end portion of the output shaft 6 is penetrated through the tube part 71. The tube part 71 supports the output shaft 6 (rotor 10) so as to be movable in the axial line "L" direction and rotatable around the axial line "L". The flange part 72 is capable of slidably contacting with the rotor main body 22 (first bearing plate 26) from the lower side "L2". As shown in FIG. 2, when the rotor main body 22 (first bearing plate 26) is located at a lower side position where the rotor main body 22 (first bearing plate 26) is slidably contacted with the flange part 72, a tip end of a protruded shaft portion of the output shaft 6 which is protruded from the tube part 71 to the lower side "L2" is separated from the bottom face 68a of the bearing member holding recessed part 68 in the axial line "L" direction. In other words, even in a case that the output shaft 6 is moved most to the bottom face 68a side of bearing member holding recessed part 68, a gap space is secured between the tip end of the protruded shaft portion of the output shaft 6 and the bottom face 68a of the bearing member holding recessed part 68.

A space between the bottom face 68a of the bearing member holding recessed part 68 and the tube part 71 of the first bearing member 15 on an inner side of the bearing member holding recessed part 68 is structured as a first lubricant storage part 81 where lubricant 82 such as grease is stored. In this embodiment, the opening 77 of the opposed face 65a and the first lubricant storage part 81 are communicated with each other through a gap space between the groove part 73 of the tube part 71 and the ring-shaped inner wall face 68b of the bearing member holding recessed part 68. In other words, the gap space between the groove part 73 of the tube part 71 and the ring-shaped inner wall face 68b of the bearing member holding recessed part 68 is a communication path 78 structured to communicate the opening 77 with the first lubricant storage part 81.

Next, as shown in FIG. 6, an under face of the sealing member bottom part 65 is provided with a first protruded part 85 in a circular cylindrical shape (protruded part) which is protruded to the lower side "L2" from a center portion and a ring-shaped protruded part 86 which is protruded to the lower side "L2" so as to surround the first protruded part 85 on an outer peripheral side with respect to the first protruded part 85. A ring-shaped face 87 perpendicular to the axial line "L" is provided between the first protruded part 85 and the ring-shaped protruded part 86. The ring-shaped protruded part 86 is provided with a ring-shaped tapered face 88 which is inclined to the lower side "L2" toward an outer peripheral side from the ring-shaped face 87, and a ring-shaped end face 89 which is extended from the tapered face 88 toward an outer peripheral side in a direction perpendicular to the axial line "L". An outer peripheral edge portion of the ring-shaped end face 89 where the connector 20 is located on an outer side in the radial direction is provided with a second protruded part 90. As shown in FIG. 4, a shape of the second protruded part 90 which is viewed in the axial line "L" direction is a rectangular shape which is long in the circumferential direction. The second protruded part 90 is located between the first protruded part 85 and the connector 20 in the radial direction. The second protruded part 90 is located at a position closer to the connector 20 than the first protruded part 85.

As shown in FIG. 2, the first protruded part 85 is overlapped with the bearing member holding recessed part 68 when viewed in the axial line "L" direction. The bottom face 68a of the bearing member holding recessed part 68 is located on an inner side of the first protruded part 85. Therefore, at least a lower side portion of the first lubricant storage part 81 is located on an inner side of the first protruded part 85. The tapered face 88 of the ring-shaped protruded part 86 is provided along inclinations of lower sides "L2" of the coils 33 which are wound around the respective salient pole parts 36. The second protruded part 90 is, when viewed in the axial line "L" direction, overlapped with an outer peripheral edge portion of the ring-shaped part 35 of the stator core 31, and overlapped with the tip ends of the bending parts 63b of the coil wire connecting parts 63 of the terminal pins 42 of the connector 20. The ring-shaped end face 89 of the ring-shaped protruded part 86 is located on an upper side "L1" with respect to the circular end face 85a on the lower side "L2" of the first protruded part 85. The rectangular end face 90a (under end face) of the second protruded part 90 is located at the same height position as the circular end face 85a of the first protruded part 85 in the axial line "L" direction and is located on one imaginary face "S" perpendicular to the axial line "L".

The sealing member tube part 66 is, as shown in FIG. 7, provided from the lower side "L2" to the upper side "L1" with a large diameter tube portion 91 and a small diameter tube portion 92 whose outer diameter dimension is smaller than that of the large diameter tube portion 91. As shown in FIG. 2, an outer diameter of the large diameter tube portion 91 is larger than an outer diameter of the ring-shaped part 35 of the stator core 31, and an outer diameter of the small diameter tube portion 92 is smaller than the outer diameter of the ring-shaped part 35 of the stator core 31.

As shown in FIG. 7, a plurality of circular arc-shaped opening parts 93 is provided in a boundary portion between the large diameter tube portion 91 and the small diameter tube portion 92 in the sealing member tube part 66 so that outer peripheral edge portions of the ring-shaped part 35 of the stator core 31 are exposed to the upper side "L1" from the resin sealing member 13. Further, a ring-shaped end face 94 perpendicular to the axial line "L" is provided on an outer peripheral side of the circular arc-shaped opening parts 93 of the resin sealing member 13. The ring-shaped part exposed portions 35a of the stator core 31 which are exposed from the circular arc-shaped opening parts 93 and the ring-shaped end face 94 are located on the same plane perpendicular to the axial line "L". An upper end portion of the large diameter tube portion 91 is provided with four engaging projections 95 which are projected to an outer peripheral side with equal angular intervals.

An inner peripheral face of the sealing member tube part 66 is, from the lower side "L2" to the upper side "L1", provided with a small diameter inner peripheral face portion 96 and a large diameter inner peripheral face portion 97 whose inner diameter dimension is larger than that of the small diameter inner peripheral face portion 96. A curvature radius of the small diameter inner peripheral face portion 96 is substantially equal to a curvature radius of the inner peripheral side end face 36a of the salient pole part 36. The small diameter inner peripheral face portion 96 is provided with a plurality of opening parts 98 which expose inner peripheral side end faces 36a of the respective salient pole parts 36 of the stator core 31 to an inner peripheral side. Further, the small diameter inner peripheral face portion 96 is provided with cut-out parts 99 which expose end portions on an inner peripheral side of the respective salient pole parts 36 to the upper side "L1". Each of the cut-out parts 99 is formed in a groove shape which is extended in the axial line "L" direction from an edge of the opening part 98 to an upper end edge of the small diameter inner peripheral face portion 96. Since a plurality of the cut-out parts 99 is provided, a center portion in the circumferential direction of an upper face of an end portion on an inner peripheral side of each of the salient pole parts 36 is formed as a salient pole part exposed portion 36b which is exposed to the upper side "L1".

Inner peripheral side end faces 36a of the respective salient pole parts 36 exposed from the opening parts 98 are continuously connected with the small diameter inner peripheral face portion 96 without a step. An anti-rust agent is applied to the inner peripheral side end faces 36a of the respective salient pole parts 36 which are exposed from the opening parts 98. Further, the anti-rust agent is also applied to the salient pole part exposed portions 36b of the respective salient pole parts 36 which are exposed from the cut-out parts 99. The anti-rust agent is, for example, an epoxy coating.

As shown in FIG. 6, the connector sealing part 67 covers the connector 20 from the upper side "L1" and a lower end portion of the frame part 43 is exposed to the lower side "L2". In other words, in the connector 20, the step part end face 46a of the frame part 43 (first step part portion end face 51a and second step part portion end face 52a), a portion which is located on the lower side "L2" from the step part end face 46a, and the connection step part end face 53a are not covered by the connector sealing part 67 and are exposed to the outside.

Further, as shown in FIG. 4, the connector sealing part 67 is provided with an outer peripheral face portion 70 on its outer peripheral face which surrounds the frame part 43 and are respectively continuously connected with the first step part portion end face 51a, the second step part portion end face 52a, and the connection step part end face 53a without a step. The outer peripheral face portion 70 is provided with a first outer peripheral face portion 70a which is continuously connected with the first step part portion end face 51a without a step on an outer peripheral side of the first step part portion end face 51a, a second outer peripheral face portion 70b which is continuously connected with the second step part portion end face 52a without a step on an outer peripheral side of the second step part portion end face 52a, and a third outer peripheral face portion 70c which is continuously connected with the connection step part end face 53a without a step on an outer peripheral side of the connection step part end face 53a. When viewed in the axial line "L" direction, the first outer peripheral face portion 70a and the second outer peripheral face portion 70b are formed in a ring shape surrounding the frame part 43.

In this embodiment, as shown in FIG. 2, a lower end portion of the frame part 43 of the connector 20 which is exposed to the lower side "L2" from the resin sealing member 13 is not projected to the lower side from the imaginary face "S". In other words, the lower end of the connector 20 (lower end of the frame part 43) is located on the upper side "L1" with respect to the circular end face 85a of the first protruded part 85 of the sealing member bottom part 65 and the rectangular end face 90a of the second protruded part 90. Further, as shown in FIG. 4, a length dimension "D1" in the circumferential direction of the second protruded part 90 is longer than a length dimension "D2" in the circumferential direction of the opening 43a of the frame part 43. Therefore, when the pump device 1 is placed on a placing face of a workbench in a posture that the opposite-to-output side faces the lower side "L2", the pump device 1 stands on its own with the circular end face 85a of the first protruded part 85 and the rectangular end face 90a of the second protruded part 90 of the sealing member bottom part 65 as a setting face, and the tip end of the frame part 43 of the connector 20 exposed from the resin sealing member 13 to the lower side "L2" does not contact with the placing face of the workbench.

The resin sealing member 13 is formed of BMC (Bulk Molding Compound). In this embodiment, the stator 11 and the connector 20 are disposed in a die and resin is injected into the die and cured and, as a result, the resin sealing member 13 is formed. In other words, the resin sealing member 13 is integrally molded with the stator 11 and the connector 20 by insert molding.

(Cover Member)

Figure 13:
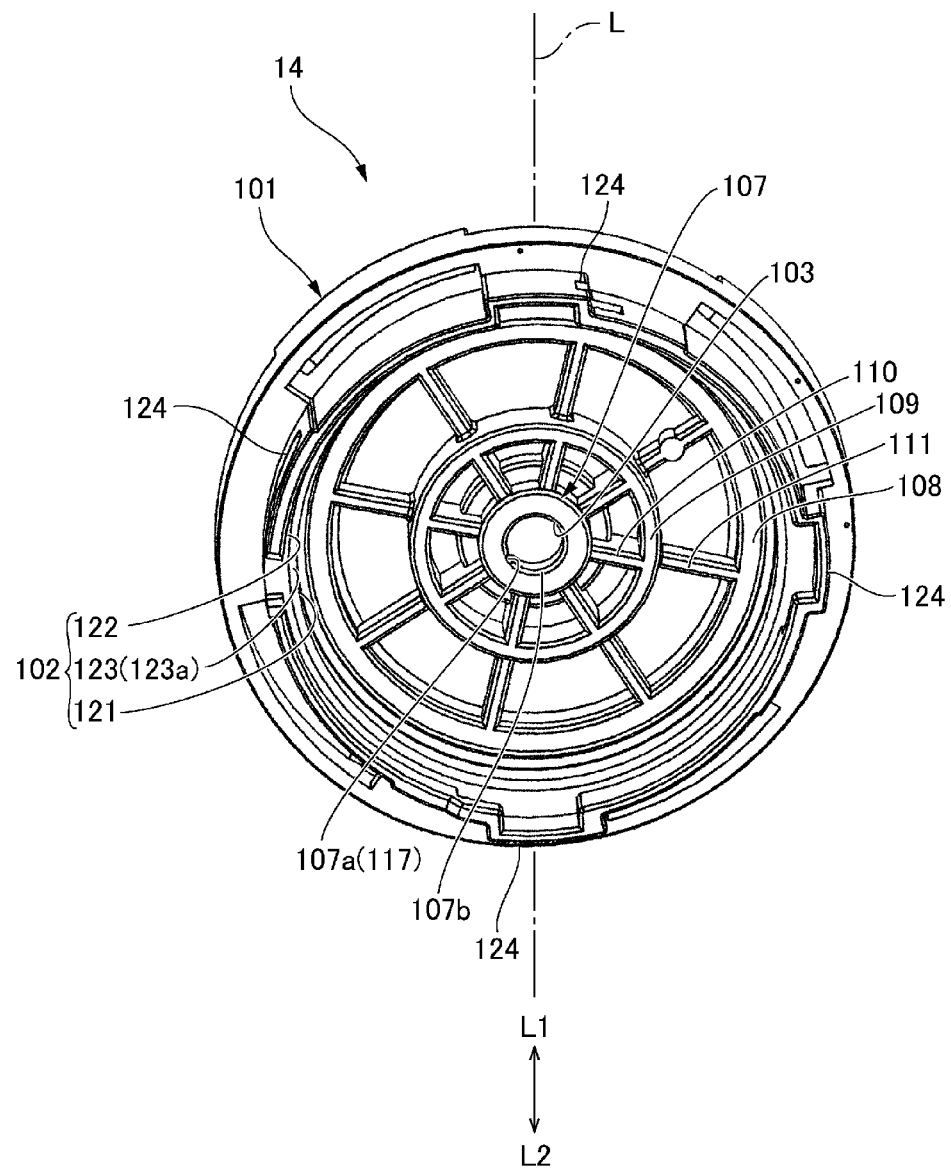
FIG. 13 is a perspective view showing a cover member which is viewed from an opposite-to-output side.

FIG. 13 is a perspective view showing the cover member 14 which is viewed from the lower side "L2". The cover member 14 is made of resin and is fixed to the upper side "L1" of the resin sealing member 13. As shown in FIGS. 6 and 13, the cover member 14 is provided with a cover member ceiling part 101 in a circular plate shape and a cover member tube part 102 which is extended to the lower side "L2" from an outer peripheral side of the cover member ceiling part 101.

As shown in FIG. 13, the cover member ceiling part 101 is provided with a through hole 103 which penetrates through the center in the axial line "L" direction. When viewed in the axial line "L" direction, the through hole 103 is located at a position overlapping with the bearing member holding recessed part 68 of the resin sealing member 13. As shown in FIG. 5, a center portion of an upper face of the cover member ceiling part 101 is provided with a circular recessed part 104 surrounding the through hole 103. A sealing member 105 in a circular ring shape is inserted from the upper side "L1" and fixed to the circular recessed part 104.

As shown in FIG. 13, an under face of the cover member ceiling part 101 is provided in the center portion with a bearing member holding tube part 107 which is coaxial with the through hole 103. A center hole of the bearing member holding tube part 107 is the through hole 103. The under face of the cover member ceiling part 101 is provided with an outer side ring-shaped rib 108 along its circular outer peripheral edge. In addition, the under face of the cover member ceiling part 101 is provided with a circular inner side ring-shaped rib 109 between the bearing member holding tube part 107 and the outer side ring-shaped rib 108. Inner side ribs 110 which are radially extended from the bearing member holding tube part 107 and reach the inner side ring-shaped rib 109 are provided between the bearing member holding tube part 107 and the inner side ring-shaped rib 109. Outer side ribs 111 which are radially extended from the inner side ring-shaped rib 109 and reach the outer side ring-shaped rib 108 are provided between the inner side ring-shaped rib 109 and the outer side ring-shaped rib 108. The bearing member holding tube part 107, the outer side ring-shaped rib 108 and the inner side ring-shaped rib 109 are coaxial with each other. An under end face of the bearing member holding tube part 107, an under end face of the outer side ring-shaped rib 108, and an under end face of inner side ring-shaped rib 109 are flat faces perpendicular to the axial line "L".

As shown in FIG. 2, a protruding amount of the bearing member holding tube part 107 from the under face of the cover member ceiling part 101 is larger than a protruding amount of the inner side ring-shaped rib 109 from the under face of the cover member ceiling part 101. Under faces of the inner side ribs 110 and an under face of the inner side ring-shaped rib 109 are located on the same plane. The protruding amount of the inner side ring-shaped rib 109 from the under face of the cover member ceiling part 101 is larger than a protruding amount of the outer side ring-shaped rib 108 from the under face of the cover member ceiling part 101. The under faces of the outer side ribs 111 and the under face of the outer side ring-shaped rib 108 are located on the same plane.

As shown in FIG. 13, the bearing member holding tube part 107 is provided with a groove 107a extended in the axial line "L" direction in a part in the circumferential direction of an inner peripheral wall of the center hole (through hole 103). Further, the bearing member holding tube part 107 is provided with a chamfer part 107b in a taper shape which is inclined to the upper side "L1" toward the center hole at an opening edge of the center hole in the under end face. As shown in FIG. 6, the second bearing member 16 is held by the center hole of the bearing member holding tube part 107.

The same member as the first bearing member 15 shown in FIG. 12 is used as the second bearing member 16 which is disposed with their upper and lower sides reversed. Therefore, the second bearing member 16 is provided with a tube part 71 having a center hole through which the output shaft 6 is penetrated and a flange part 72 which is enlarged from a lower end of the tube part 71 to an outer peripheral side. A part in a circumferential direction of an outer peripheral face of the tube part 71 is formed with a groove part 73 which is extended in the axial line "L" direction with a constant width. Further, a projecting part 74 which is extended in the axial line "L" direction with a constant width is formed on an outer peripheral face of the tube part 71 on an opposite side to the groove part 73 with the axial line "L" interposed therebetween. The groove part 73 is formed with a gate trace 75 which was connected with a gate for resin injection when the second bearing member 16 was injection-molded. A contour of the flange part 72 is, when viewed in the axial line "L" direction, a "D"-shape having a straight contour portion 72a extended in a straight shape and a circular arc contour portion 72b in a circular arc shape connecting both ends of the straight contour portion 72a with each other. The straight contour portion 72a is provided at the same angular position as the groove part 73 around the axial line "L". In other words, the straight contour portion 72a is located on an opposite side to the projecting part 74 with the axial line "L" interposed therebetween. A lower end face of the tube part 71 located on an inner peripheral side of the flange part 72 is formed with a tapered face 76 which is inclined to the upper side "L1" toward the center hole of the tube part 71.

The tube part 71 of the second bearing member 16 is inserted into the bearing member holding tube part 107 in a posture that positions of the projecting part 74 of the tube part 71 and the groove 107a of the bearing member holding tube part 107 are coincided with each other around the axial line "L". Next, as shown in FIG. 6, the flange part 72 is abutted with the bearing member holding tube part 107 from the lower side "L2" and the second bearing member 16 is fixed to the bearing member holding tube part 107. In a state that the second bearing member 16 is fixed to the bearing member holding tube part 107, a lower end face of the flange part 72 is perpendicular to the axial line "L". The tube part 71 and the seal member 105 face each other with a space therebetween in the axial line "L" direction. In addition, in the under end face of the bearing member holding tube part 107, an opening 115 (gap space) is formed between the straight contour portion 72a of the flange part 72 and the chamfer part 107b of the bearing member holding tube part 107. Further, the projecting part 74 of the second bearing member 16 and the groove 107a of the bearing member holding tube part 107 structure a turning prevention mechanism 117 which prevents turning of the second bearing member 16 around the axial line "L".

The second bearing member 16 supports the rotor 10 in a state that the output shaft 6 is penetrated through the rotor 10. The tube part 71 of the second bearing member 16 supports the output shaft 6 (rotor 10) movable in the axial line "L" direction and rotatably supports the output shaft 6 around the axial line "L". The flange part 72 is capable of slidably contacting with the rotor main body 22 (second bearing plate 27) from the upper side "L1". Therefore, when the rotor 10 is rotated, the rotor 10 is moved in the axial line "L" direction between a lower position (see FIG. 2) where the rotor main body 22 is slidably contacted with the flange part 72 of the first bearing member 15 and an upper position where the rotor main body 22 is slidably contacted with the flange part 72 of the second bearing member 16.

A gap space between the second bearing member 16 and the sealing member 105 (through hole portion which is located on the upper side "L1" and the output side with respect to the second bearing member 16) on an inner side of the through hole 103 is a second lubricant storage part 118 where lubricant 119 such as grease is stored. As shown in FIG. 2, the opening 115 of the under end face provided on the opposite-to-output side of the bearing member holding tube part 107 and the second lubricant storage part 118 is communicated with each other through a gap space between the groove part 73 of the tube part 71 and an inner wall face of the center hole of the bearing member holding tube part 107. In other words, the gap space between the groove part 73 of the tube part 71 and the inner wall face of the center hole of the bearing member holding tube part 107 is a communication path 116 structured to communicate the opening 115 with the second lubricant storage part 118.

The cover member tube part 102 is, as shown in FIGS. 6 and 13, extended to the lower side "L2" from an outer peripheral side with respect to the outer side ring-shaped rib 108. The cover member tube part 102 is, as shown in FIG. 2, provided with an upper side ring-shaped tube portion 121, which is overlapped and covers the small diameter tube portion 92 of the resin sealing member 13 from an outer peripheral side, and a lower side ring-shaped tube portion 122 which is located on an outer peripheral side of the large diameter tube portion 91 on a lower side with respect to the upper side ring-shaped tube portion 121. A ring-shaped step part 123 is provided between the upper side ring-shaped tube portion 121 and the lower side ring-shaped tube portion 122 in an inner peripheral face of the cover member tube part 102. The ring-shaped step part 123 is provided with a ring-shaped face 123a which faces the lower side "L2". The ring-shaped face 123a is a flat face perpendicular to the axial line "L". As shown in FIGS. 6 and 13, the lower side ring-shaped tube portion 122 is provided with an engaged part 124 which is engaged with the engaging projection 95 of the resin sealing member 13 at four positions in the circumferential direction.

The cover member 14 covers the resin sealing member 13 from the upper side "L1" in a state that the rotor 10 is disposed on an inner side of the resin sealing member 13 and the rotor 10 is supported by the first bearing member 15. When the resin sealing member 13 is to be covered by the cover member 14, an adhesive is applied to an outer peripheral edge portion of an upper face of the resin sealing member 13.

When the resin sealing member 13 is to be covered with the cover member 14, as shown in FIG. 2, the output shaft 6 is penetrated through the tube part 71 of the second bearing member 16 which is held by the cover member 14, and the lower end portion of the inner side ring-shaped rib 109 is fitted into an inner peripheral side of the sealing member tube part 66 of the resin sealing member 13. As a result, the cover member 14 and the resin sealing member 13 are positioned each other in the radial direction, and the axial line "L" of the output shaft 6 and the center axial line of the stator 11 are coincided with each other. Further, the ring-shaped face 123a of the ring-shaped step part 123 of the cover member tube part 102 is abutted with the ring-shaped end face 94 between the large diameter tube portion 91 and the small diameter tube portion 92 of the resin sealing member 13. As a result, the cover member 14 and the resin sealing member 13 are positioned each other in the axial line "L" direction. After that, the cover member 14 and the resin sealing member 13 are relatively turned in the circumferential direction and, as shown in FIG. 1, the engaging projections 95 of the resin sealing member 13 and the engaged parts 124 of the cover member 14 are engaged with each other. In this manner, the cover member ceiling part 101 covers the rotor 10 and the resin sealing member 13 from the upper side "L1" in a state that the output shaft 6 is penetrated through the cover member ceiling part 101 in the axial line "L" direction. Further, the output shaft 6 is penetrated through the sealing member 105 which is disposed in the circular recessed part 104 of the cover member ceiling part 101. The sealing member 105 seals between the output shaft 6 and the cover member 14. In addition, the upper side ring-shaped tube portion 121 of the cover member tube part 102 surrounds the small diameter tube portion 92 of the resin sealing member 13 from the outer peripheral side.

When the cover member 14 is fixed to the resin sealing member 13, the rotor 10 is supported by the first bearing member 15 and the second bearing member 16 in a state that the rotor main body 22 is movable in the axial line "L" direction between the lower position 10A (first position, see FIG. 14) where the rotor main body 22 is slidably contacted with the upper end face 80 of the flange part 72 (first slidably contacting part) of the first bearing member 15 and the upper position 10B (second position, see FIG. 15) where the rotor main body 22 is slidably contacted with the under end face of the flange part 72 (second slidably contacting part) of the second bearing member 16, and in a state that the rotor main body 22 is rotatable around the axial line "L". In this embodiment, the lower end of the output shaft 6 is separated from the bottom face 68a of the bearing member holding recessed part 68 at the lower position 10A.

An impeller 5 is connected with an upper end portion of the output shaft 6. After that, the cover member 14 is covered with the case body 3 from the upper side "L1". As a result, a space sectioned between the cover member 14 and the case body 3 is structured as the pump chamber 4, and the impeller 5 is disposed in the pump chamber 4.

(Supply Operation of Lubricant)

Figure 14:
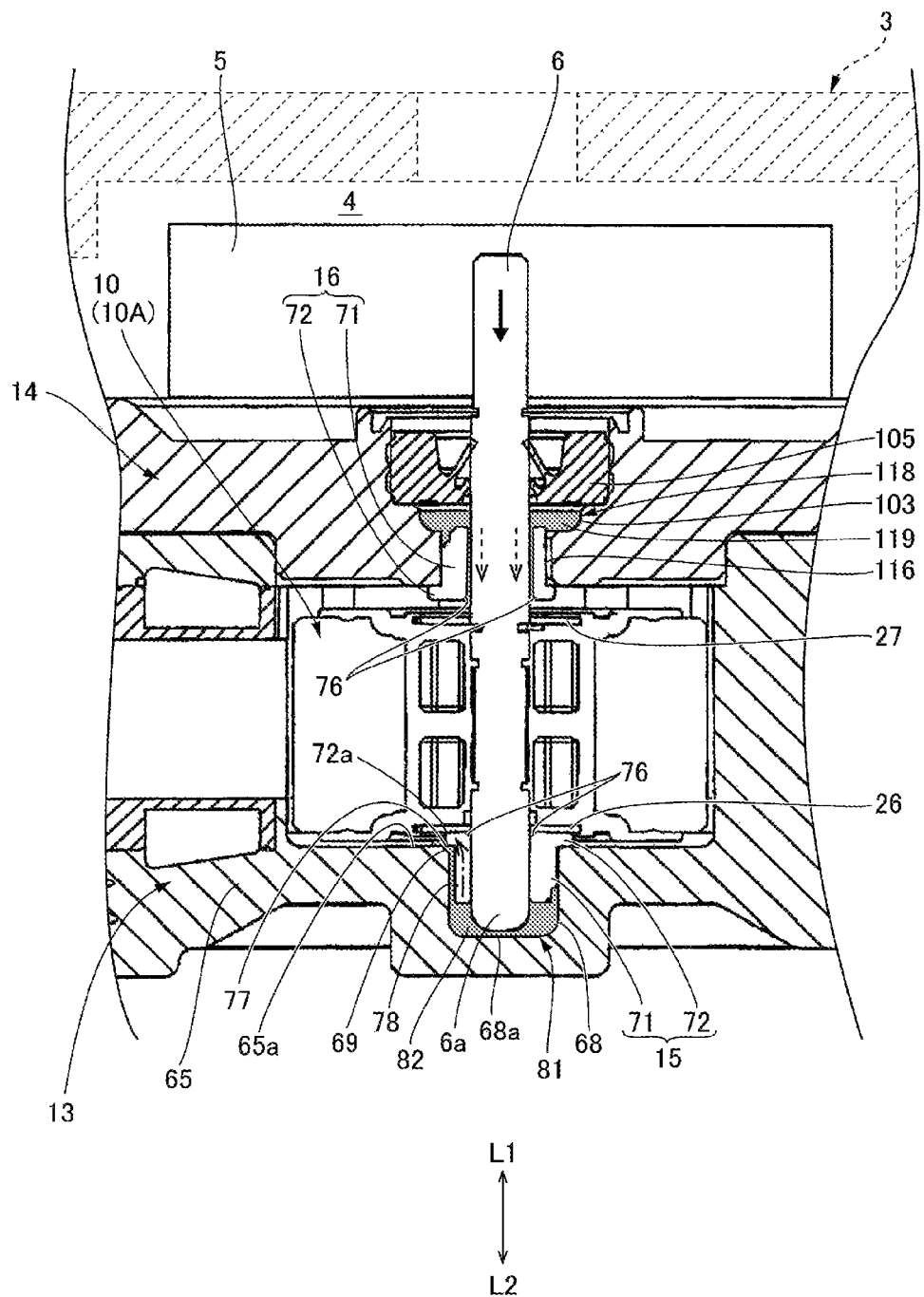
FIG. 14 is an explanatory view showing a supply operation of a lubricant in a state that a rotor is located at a lower side position.
Figure 15:
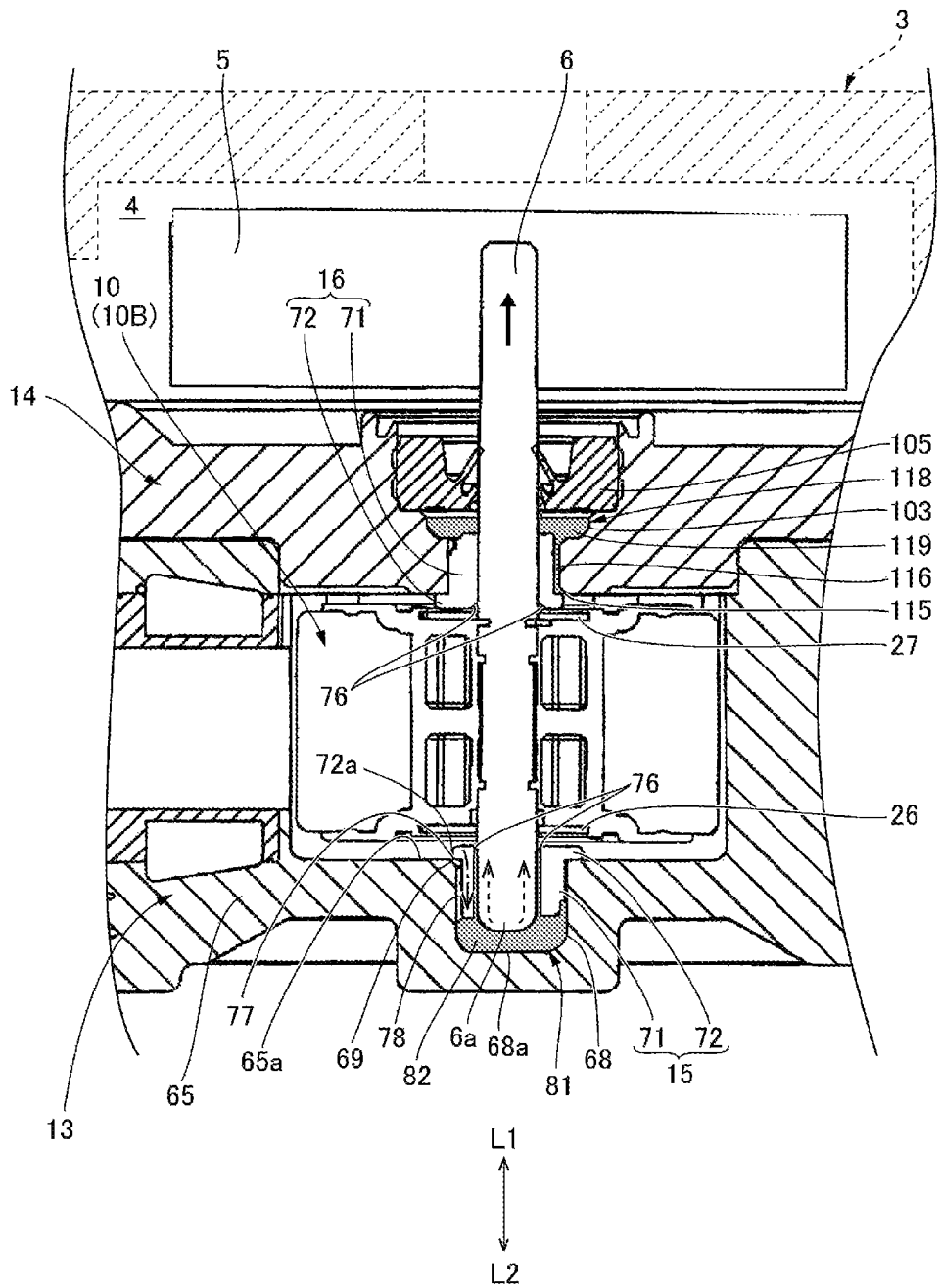
FIG. 15 is an explanatory view showing a supply operation of a lubricant in a state that a rotor is located at an upper side position.

FIGS. 14 and 15 are explanatory views showing supply operations of the lubricants 82 and 119 to the first bearing member 15 and the second bearing member 16. FIG. 14 shows a state that the rotor 10 is located at the lower position 10A where the rotor 10 is slidably contacted with the flange part 72 of the first bearing member 15. FIG. 15 shows a state that the rotor 10 is located at the upper position 10B where the rotor main body 22 is slidably contacted with the flange part 72 of the second bearing member 16.

As shown in FIGS. 14 and 15, the first bearing member 15 is provided with the tube part 71 which supports the output shaft 6 of the rotor 10 movable in the axial line "L" direction and rotatable around the axial line "L". The tube part 71 is inserted into and held by the bearing member holding recessed part 68 of the resin sealing member 13. In the inner side of the bearing member holding recessed part 68, a space between the bottom face 68a of the bearing member holding recessed part 68 and the tube part 71 is the first lubricant storage part 81 where the lubricant 82 is stored. On the other hand, the second bearing member 16 is provided with the tube part 71 which supports the output shaft 6 of the rotor 10 movable in the axial line "L" direction and rotatable around the axial line "L". The tube part 71 is inserted into and held by the center hole of the bearing member holding tube part 107 of the cover member 14 (through hole 103 of the cover member 14). The through hole portion on the upper side in the through hole 103 of the cover member 14 with respect to the tube part 71 is the second lubricant storage part 118 where the lubricant 119 is stored.

As shown in FIG. 14, in a state that the rotor 10 is located at the lower position 10A, a lower end portion of the output shaft 6 is located in the lubricant 82 stored in the first lubricant storage part 81. In this state, when the motor 2 is driven, the impeller 5 which is rotated in the pump chamber 4 and pumps the fluid is moved up and down in the pump chamber 4.

When the impeller 5 is moved to the upper side "L1" from the state shown in FIG. 14, the rotor 10 is moved to the upper side "L1" together with the impeller 5 and is reached to the upper position 10B shown in FIG. 15. When the rotor 10 is moved from the lower position 10A to the upper position 10B, as shown by the thick line arrow in FIG. 15, the output shaft 6 supported by the first bearing member 15 is moved toward the upper side "L1". Therefore, the lubricant 82 stored in the first lubricant storage part 81 is pulled (supplied) to a gap space between the output shaft 6 and the first bearing member 15 as shown by the arrows of a broken chain line. In this embodiment, even in a state that the output shaft 6 is located at the lower position 10A, a space is secured between the tip end of the protruded shaft portion of the output shaft 6 and the bottom face 68a of the bearing member holding recessed part 68. Therefore, a large quantity of the lubricant 82 is held in the first lubricant storage part 81 in comparison with a case that the lubricant 82 is applied between the first bearing member 15 and the output shaft 6. Accordingly, even in a case that the lubricant 82 is dispersed accompanied with rotation of the rotor 10, the lubricant 82 between the output shaft 6 and the first bearing member 15 can be prevented or restrained from being depleted due to a lapse of time.

Next, when the impeller 5 is moved to the lower side "L2" from the state at the upper position 10B shown in FIG. 15, the rotor 10 is moved to the lower side "L2" together with the impeller 5 and is reached to the lower position 10A shown in FIG. 14. When the rotor 10 is moved to the lower position 10A from the upper position 10B, as shown by the thick line arrow in FIG. 14, the output shaft 6 is moved to the lower side "L2". Therefore, a protruding amount of the protruded portion 6a of the output shaft 6 which is protruded from the tube part 71 of the first bearing member 15 to the bottom face 68a side of the bearing member holding recessed part 68 is increased, and the lower end portion of the output shaft 6 is entered into the lubricant 82 stored in the first lubricant storage part 81. In this case, when a protruding amount of the protruded portion 6a is increased, the capacity of the first lubricant storage part 81 is decreased correspondingly. Therefore, the lubricant 82 which is unable to be stored in the first lubricant storage part 81 escapes to the communication path 78 as shown by the arrow of an alternate long and short dash line in FIG. 14. Further, in a case that the pump device 1 is to be manufactured, when the lubricant 82 is injected into the first lubricant storage part 81 more than the capacity of the first lubricant storage part 81, an excessive lubricant 82 is discharged to a side of the opposed face 65a of the resin sealing member 13 through the communication path 78 and the opening 77.

Further, when the impeller 5 is moved from the state shown in FIG. 15 to the lower side "L2" and is reached to the state shown in FIG. 14, the output shaft 6 is moved to the lower side "L2" and thus the lubricant 119 stored in the second lubricant storage part 118 is pulled (supplied) to a gap space between the output shaft 6 and the second bearing member 16 as shown by the arrows of a broken chain line in FIG. 14. In this embodiment, a large quantity of the lubricant 119 is held in the second lubricant storage part 118 in comparison with a case that the lubricant 119 is applied between the second bearing member 16 and the output shaft 6. Therefore, even in a case that the lubricant 119 is dispersed accompanied with rotation of the rotor 10, the lubricant 119 between the second bearing member 16 and the output shaft 6 can be prevented or restrained from being depleted due to a lapse of time.

After that, when the impeller 5 is moved to the upper side "L1" again, the rotor 10 is moved to the upper side "L1" together with the impeller 5 and is reached to the upper position 10B shown in FIG. 15. When the rotor 10 is moved from the lower position 10A to the upper position 10B, the output shaft 6 is moved to the upper side "L1" and thus a protruding amount of the protruded portion 6a of the output shaft 6 which is projected to the lower side "L2" from the tube part 71 of the first bearing member 15 is decreased. In other words, even in the state that the rotor 10 is moved to the upper position 10B, the lower end (protruded portion 6a) of the output shaft 6 is protruded to the lower side from the tube part 71. Therefore, in the state that the rotor 10 is located at the upper position 10, the capacity of the first lubricant storage part 81 is increased in comparison with the state that the rotor 10 is located at the lower position 10A.

When the capacity of the first lubricant storage part 81 is increased, the lubricant 82 escaped to the communication path 78 is returned to the first lubricant storage part 81 as shown by the arrow of an alternate long and short dash line in FIG. 15. Therefore, the lubricant 82 can be held in the first lubricant storage part 81 over a long period. Further, when the impeller 5 is moved to the upper side "L1" again, the output shaft 6 is moved to the upper side "L1" and thus the lubricant 82 stored in the first lubricant storage part 81 is pulled (supplied) to a gap space between the output shaft 6 and the first bearing member 15 as shown by the arrow of a broken chain line.

In this embodiment, the opening 77 of the communication path 78 for allowing the lubricant 82 to escape from the first lubricant storage part 81 is provided between the taper-shaped chamfer part 69 provided in the opposed face 65a of the resin sealing member 13 at the opening edge of the bearing member holding recessed part 68 and the straight contour portion 72a of the flange part 72. Therefore, the communication path 78 can be bent between the flange part 72 of the first bearing member 15 and the chamfer part 69 of the resin sealing member 13 and thus flow passage resistance of the communicating path 78 can be increased. Accordingly, the lubricant 82 escaped to the communication path 78 can be restrained from being dispersed from the communication path 78 to an outer side through the opening 77.

Further, as shown in FIGS. 14 and 15, the upper end portion of the tube part 71 of the first bearing member 15 is provided with the tapered face 76. Therefore, a space between the tapered face 76 and the output shaft 6 is structured as a lubricant reservoir and thus the lubricant 82 can be held. Similarly, the lower end portion of the tube part 71 of the second bearing member 16 is provided with the tapered face 76 and thus a space between the tapered face 76 and the output shaft 6 is structured as a lubricant reservoir and thus the lubricant 119 can be held.

(Operations and Effects)

In this embodiment, the space between the bottom face 68a of the bearing member holding recessed part 68 and the tube part 71 of the first bearing member 15 on the inner side of the bearing member holding recessed part 68 of the resin sealing member 13 is the first lubricant storage part 81 where the lubricant 82 is stored. Therefore, each time when the rotor 10 is moved in the axial line "L" direction, the lubricant 82 is supplied from the first lubricant storage part 81 to a gap space between the output shaft 6 and the first bearing member 15. Further, the inside of the through hole 103 of the cover member 14 which holds the second bearing member 16 is provided with the second lubricant storage part 118 where the lubricant 119 is stored. Therefore, each time when the rotor 10 is moved in the axial line "L" direction, the lubricant 119 is supplied from the second lubricant storage part 118 to a gap space between the output shaft 6 and the second bearing member 16. Accordingly, even in a case that the lubricants 82 and 119 are dispersed accompanied with rotation of the rotor 10, the lubricants 82 and 119 are prevented from being depleted due to a lapse of time and thus obstruction to smooth rotation of the output shaft 6 and generation of abnormal noise can be prevented or restrained. As a result, obstruction to smooth rotation of the impeller 5 which is attached to the output shaft 6 of the motor 2 and generation of abnormal noise in the pump device 1 can be prevented or restrained.

Further, the groove part 73 is provided in the tube part 71 of the first bearing member 15 and thus the communication path 78 for allowing the lubricant 82 to escape from the first lubricant storage part 81 is easily provided between the first bearing member 15 and the resin sealing member 13.

In addition, in this embodiment, when the rotor 10 is located at the lower position 10A, the lower end of the output shaft 6 is separated from the bottom face 68a of the bearing member holding recessed part 68. Therefore, generation of abnormal noise due to contacting of the bottom face 68a of the bearing member holding recessed part 68 with the output shaft 6 can be avoided.

In this embodiment, heat is generated between the first bearing member 15 and the rotor 10 due to slidably contacting of the first bearing member 15 with the rotor 10. However, the sealing member bottom part 65 of the resin sealing member 13 which holds the first bearing member 15 is, when viewed in the axial line "L" direction, provided with the first protruded part 85 which is protruded to the lower side "L2" at a position overlapping with the bearing member holding recessed part 68. As a result, a surface area of the sealing member bottom part 65 is increased and thus heat transmitted from the first bearing member 15 to the sealing member bottom part 65 is easily radiated to the outside.

Further, the bottom face 68a of the bearing member holding recessed part 68 is located on an inner side of the first protruded part 85 and thus the first lubricant storage part 81 is formed on the inner side of the first protruded part 85.

Therefore, heat generated by slidably contacting of the first bearing member 15 with the rotor 10 can be radiated from the first bearing member 15 to the sealing member bottom part 65 through the lubricant 82 stored in the first lubricant storage part 81.

Further, in the first bearing member 15 and the second bearing member 16 which are resin molded products, a weld line is formed on the opposite side to the gate trace 75 with the center hole (axial line "L") interposed therebetween and thus strength of a portion where the weld line is formed is decreased. On the other hand, in this embodiment, each of the tube parts 71 of the first bearing member 15 and the second bearing member 16 is provided with the projecting part 74 extended in the axial line "L" direction with a constant width on the opposite side to the groove part 73 having the gate trace 75 with the center hole (axial line "L") interposed therebetween. Therefore, strengths of the bearing members 15 and 16 can be secured. Further, the projecting part 74 of the first bearing member 15 and the groove 68c of the bearing member holding recessed part 68 structure the turning prevention mechanism 79 and thus turning of the first bearing member 15 around the axial line "L" is restricted. Similarly, the projecting part 74 of the second bearing member 16 and the groove 107a of the bearing member holding tube part 107 structure the turning prevention mechanism 117 and thus turning of the second bearing member 16 around the axial line "L" is restricted.

In the embodiment described above, the communication path 116 is provided between the tube part 71 of the second bearing member 16 and the inner wall face of the center hole of the bearing member holding tube part 107 of the cover member 14. However, the communication path 116 may be omitted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
 a rotor comprising an output shaft and a rotor main body which holds the output shaft from an outer peripheral side;
 a bearing member structured to support the output shaft movable in a direction of an axial line and rotatable around the axial line; and
 a bearing holding member which holds the bearing member;
 wherein when one side of the output shaft in the direction of the axial line is referred to as an output side and another side of the output shaft is referred to as an opposite-to-output side, the bearing member comprises:
 a tube part which supports a shaft portion on the opposite-to-output side of the output shaft with respect to the rotor main body in a penetrated state; and
 a slidably contacting part which is capable of slidably contacting with the rotor main body from the opposite-to-output side;
 wherein the bearing holding member comprises an opposed face which faces the rotor main body from the opposite-to-output side, and a recessed part which is provided in the opposed face;

wherein the tube part of the bearing member is inserted into the recessed part;

wherein the tube part is separated from a bottom face of the recessed part;

wherein a space between the bottom face of the recessed part and the tube part on an inner side of the recessed part is structured as a lubricant storage part where a lubricant is stored;

wherein a communication path is provided between the bearing holding member and the bearing member so as to be extended from the lubricant storage part to the output side and opened in the opposed face;

wherein the communication path comprises a groove part which is formed on an outer peripheral face of the tube part;

wherein the bearing member comprises a flange part which is enlarged from an end part on the output side of the tube part to an outer peripheral side and is abutted with the opposed face from the output side;

wherein an end face on the output side of the flange part is the slidably contacting part;

wherein a contour of the flame part when viewed in the direction of the axial line comprises a straight contour portion and a circular arc contour portion which connects both ends of the straight contour portion;

wherein an opening edge of the recessed part of the bearing holding member is provided with a chamfer part in a taper shape which is inclined to the opposite-to-output side toward a side of the recessed part; and wherein the communication path is opened between the chamfer part and the straight contour portion of the flange part.

2. The motor according to claim 1, further comprising a turning prevention mechanism structured to restrict turning of the bearing member around the axial line, wherein the bearing member is a resin molded product, wherein the groove part comprises a gate trace, wherein the turning prevention mechanism comprises:

a projecting part which is provided in the tube part on an opposite side to the groove part with the axial line interposed therebetween; and a groove which is provided on an inner wall face of the recessed part and into which the projecting part is inserted.

3. The motor according to claim 1, wherein an end portion on the output side of the tube part comprises a tapered face which is inclined to the opposite-to-output side toward a center hole of the tube part.

4. The motor according to claim 1, further comprising:

a stator which surrounds the rotor from an outer peripheral side; and a resin sealing member which covers the stator from the opposite-to-output side and the outer peripheral side, wherein the resin sealing member is the bearing holding member and comprises an opposite-to-output side sealing part located on the opposite-to-output side of the rotor and the stator, wherein the opposed face and the recessed part are provided in the opposite-to-output side sealing part, wherein the opposite-to-output side sealing part comprises a protruded part which is protruded to the opposite-to-output side at a position overlapping with the recessed part when viewed in the direction of the axial line, and wherein the bottom face of the recessed part is provided on an inner side of the protruded part.

5. The motor according to claim 4, wherein the groove part is formed from an end face on the opposite-to-output side of the tube part to the opposed face.

6. The motor according to claim 5, further comprising a turning prevention mechanism structured to restrict turning of the bearing member around the axial line, wherein the bearing member is a resin molded product, wherein the groove part comprises a gate trace, wherein the turning prevention mechanism comprises:

a projecting part which is provided in the tube part on an opposite side to the groove part with the axial line interposed therebetween; and a groove which is provided on an inner wall face of the recessed part and into which the projecting part is inserted.

7. The motor according to claim 5, wherein an end portion on the output side of the tube part comprises a tapered face which is inclined to the opposite-to-output side toward a center hole of the tube part.

8. A motor comprising:

a rotor comprising an output shaft and a rotor main body which holds the output shaft from an outer peripheral side;

a bearing member structured to support the output shaft movable in a direction of an axial line and rotatable around the axial line; and a bearing holding member which holds the bearing member;

wherein when one side of the output shaft in the direction of the axial line is referred to as an output side and another side of the output shaft is referred to as an opposite-to-output side, the bearing member comprises:

a tube part which supports a shaft portion on the opposite-to-output side of the output shaft with respect to the rotor main body in a penetrated state; and a slidably contacting part which is capable of slidably contacting with the rotor main body from the opposite-to-output side;

wherein the bearing holding member comprises an opposed face which faces the rotor main body from the opposite-to-output side, and a recessed part which is provided in the opposed face;

wherein the tube part of the bearing member is inserted into the recessed part;

wherein the tube part is separated from a bottom face of the recessed part;

wherein a space between the bottom face of the recessed part and the tube part on an inner side of the recessed part is structured as a lubricant storage part where a lubricant is stored;

wherein a communication path is provided between the bearing holding member and the bearing member so as to be extended from the lubricant storage part to the output side and opened in the opposed face; and wherein an end on the opposite-to-output side of the output shaft is separated from the bottom face of the recessed part at a position where the rotor main body is slidably contacted with the slidably contacting part.

9. The motor according to claim 1, further comprising:

a second bearing member structured to support the output shaft movable in the direction of the axial line and rotatable around the axial line; and a second bearing holding member which holds the second bearing member, wherein the second bearing member comprises:
a second tube part which supports a shaft portion on the output side of the output shaft with respect to the rotor main body in a penetrated state; and
a second slidably contacting part which is capable of slidably contacting with the rotor main body from the output side;
wherein the second bearing holding member comprises a through hole which penetrates through the second bearing holding member in the direction of the axial line at a position overlapping with the recessed part when viewed in the direction of the axial line,
wherein the second tube part of the second bearing member is inserted into the through hole, and
wherein the through hole comprises a second lubricant storage part where a lubricant is stored in a through hole portion on the output side with respect to the second tube part.

10. The motor according to claim 9, wherein
the rotor is capable of being moved in the direction of the axial line between a first position where the rotor main body is slidably contacted with the slidably contacting part and a second position where the rotor main body is slidably contacted with the second slidably contacting part, and
an end on the opposite-to-output side of the output shaft is separated from the bottom face of the recessed part at the first position.

11. The motor according to claim 10, wherein an opening which is provided on the opposite-to-output side of the through hole of the second bearing holding member and the second lubricant storage part are communicated with each other through a gap space between a second groove part formed on an outer peripheral face of the second tube part and an inner wall face of the through hole of the second bearing holding member.

12. The motor according to claim 10, further comprising a turning prevention mechanism structured to restrict turning of the bearing member around the axial line,
wherein the bearing member is a resin molded product,
wherein the groove part comprises a gate trace,
wherein the turning prevention mechanism comprises:
a projecting part which is provided in the tube part on an opposite side to the groove part with the axial line interposed therebetween; and
a groove which is provided on an inner wall face of the recessed part and into which the projecting part is inserted.

13. The motor according to claim 9, further comprising:
a stator which surrounds the rotor from an outer peripheral side; and
a resin sealing member which covers the stator from the opposite-to-output side and the outer peripheral side,
wherein the resin sealing member is the bearing holding member and comprises an opposite-to-output side sealing part located on the opposite-to-output side of the rotor and the stator,
wherein the opposed face and the recessed part are provided in the opposite-to-output side sealing part,
wherein the opposite-to-output side sealing part comprises a protruded part which is protruded to the opposite-to-output side at a position overlapping with the recessed part when viewed in the direction of the axial line, and
wherein the bottom face of the recessed part is provided on an inner side of the protruded part.

14. A pump device comprising:
the motor defined in claim 8;
a pump chamber; and
an impeller which is disposed in the pump chamber;
wherein the output shaft is extended into the pump chamber from an outside of the pump chamber and the impeller is attached to the output shaft.

15. The pump device according to claim 14, further comprising:
a stator which surrounds the rotor from an outer peripheral side; and
a resin sealing member which covers the stator from the opposite-to-output side and the outer peripheral side,
wherein the resin sealing member is the bearing holding member and comprises an opposite-to-output side sealing part located on the opposite-to-output side of the rotor and the stator,
wherein the opposed face and the recessed part are provided in the opposite-to-output side sealing part,
wherein the opposite-to-output side sealing part comprises a protruded part which is protruded to the opposite-to-output side at a position overlapping with the recessed part when viewed in the direction of the axial line, and
wherein the bottom face of the recessed part is provided on an inner side of the protruded part.

16. The pump device according to claim 14, wherein the communication path comprises a groove part which is formed on an outer peripheral face of the tube part from an end face on the opposite-to-output side of the tube part to the opposed face.

17. The pump device according to claim 16, wherein
the bearing member comprises a flange part which is enlarged from an end part on the output side of the tube part to an outer peripheral side and is abutted with the opposed face from the output side,
an end face on the output side of the flange part is the slidably contacting part,
a contour of the flange part when viewed in the direction of the axial line comprises a straight contour portion and a circular arc contour portion which connects both ends of the straight contour portion,
an opening edge of the recessed part of the bearing holding member is provided with a chamfer part in a taper shape which is inclined to the opposite-to-output side toward a side of the recessed part, and
the communication path is opened between the chamfer part and the straight contour portion of the flange part.

18. The pump device according to claim 17, further comprising a turning prevention mechanism structured to restrict turning of the bearing member around the axial line,
wherein the bearing member is a resin molded product,
wherein the groove part comprises a gate trace,
wherein the turning prevention mechanism comprises:
a projecting part which is provided in the tube part on an opposite side to the groove part with the axial line interposed therebetween; and
a groove which is provided on a ring-shaped inner wall face of the recessed part and into which the projecting part is inserted.

19. The pump device according to claim 14, wherein
the motor further comprises:
a second bearing member structured to support the output shaft movable in the direction of the axial line and rotatable around the axial line; and a second bearing holding member which holds the second bearing member, wherein the second bearing member comprises:

a second tube part which supports a shaft portion on the output side of the output shaft with respect to the rotor main body in a penetrated state; and a second slidably contacting part which is capable of slidably contacting with the rotor main body from the output side;

wherein the second bearing holding member comprises a through hole which penetrates through the second bearing holding member in the direction of the axial line at a position overlapping with the recessed part when viewed in the direction of the axial line, wherein the second tube part of the second bearing member is inserted into the through hole, and wherein the through hole comprises a second lubricant storage part where a lubricant is stored in a through hole portion on the output side with respect to the second tube part.

20. The pump device according to claim 19, wherein an opening which is provided on the opposite-to-output side of the through hole of the second bearing holding member and the second lubricant storage part are communicated with each other through a gap space between a second groove part formed on an outer peripheral face of the second tube part and an inner wall face of the through hole of the second bearing holding member.

21. The motor according to claim 8, wherein the communication path comprises a groove part which is formed on an outer peripheral face of the tube part.

22. The motor according to claim 8, wherein
the bearing member comprises a flange part which is enlarged from an end part on the output side of the tube part to an outer peripheral side and is abutted with the opposed face from the output side, an end face on the output side of the flange part is the slidably contacting part, a contour of the flange part when viewed in the direction of the axial line comprises a straight contour portion and a circular arc contour portion which connects both ends of the straight contour portion, an opening edge of the recessed part of the bearing holding member is provided with a chamfer part in a taper shape which is inclined to the opposite-to-output side toward a side of the recessed part, and the communication path is opened between the chamfer part and the straight contour portion of the flange part.

23. The motor according to claim 8, further comprising:

a stator which surrounds the rotor from an outer peripheral side; and a resin sealing member which covers the stator from the opposite-to-output side and the outer peripheral side, wherein the resin sealing member is the bearing holding member and comprises an opposite-to-output side sealing part located on the opposite-to-output side of the rotor and the stator, wherein the opposed face and the recessed part are provided in the opposite-to-output side sealing part, wherein the opposite-to-output side sealing part comprises a protruded part which is protruded to the opposite-to-output side at a position overlapping with the recessed part when viewed in the direction of the axial line, and wherein the bottom face of the recessed part is provided on an inner side of the protruded part.

24. The motor according to claim 8, further comprising:

a second bearing member structured to support the output shaft movable in the direction of the axial line and rotatable around the axial line; and a second bearing holding member which holds the second bearing member, wherein the second bearing member comprises:

a second tube part which supports a shaft portion on the output side of the output shaft with respect to the rotor main body in a penetrated state; and a second slidably contacting part which is capable of slidably contacting with the rotor main body from the output side;

wherein the second bearing holding member comprises a through hole which penetrates through the second bearing holding member in the direction of the axial line at a position overlapping with the recessed part when viewed in the direction of the axial line, wherein the second tube part of the second bearing member is inserted into the through hole, and wherein the through hole comprises a second lubricant storage part where a lubricant is stored in a through hole portion on the output side with respect to the second tube part.

* * * * *